US008352535B2

(12) United States Patent
Peled et al.

(10) Patent No.: US 8,352,535 B2
(45) Date of Patent: Jan. 8, 2013

(54) METHOD AND SYSTEM FOR MANAGING CONFIDENTIAL INFORMATION

(75) Inventors: Ariel Peled, Even-Yehuda (IL); Yair Grindlinger, Even-Yehuda (IL); Lidror Troyansky, Givataim (IL); Ofir Carny, Kochav-Yair (IL); Arik Baratz, Hadera (IL)

(73) Assignee: PortAuthority Technologies Inc., San Diego, CA (US)

( * ) Notice: Subject to any disclaimer, the term of this patent is extended or adjusted under 35 U.S.C. 154(b) by 1463 days.

(21) Appl. No.: 10/533,452

(22) PCT Filed: Oct. 28, 2003

(86) PCT No.: PCT/IL03/00889
§ 371 (c)(1),
(2), (4) Date: May 2, 2005

(87) PCT Pub. No.: WO2004/040464
PCT Pub. Date: May 13, 2004

(65) Prior Publication Data
US 2005/0288939 A1   Dec. 29, 2005

Related U.S. Application Data

(60) Provisional application No. 60/422,128, filed on Oct. 30, 2002.

(51) Int. Cl.
*G06F 15/16* (2006.01)
*G06F 7/00* (2006.01)
(52) U.S. Cl. ........ 709/200; 707/609; 707/705; 709/223; 709/224
(58) Field of Classification Search .................. 709/200, 709/224; 707/600, 705
See application file for complete search history.

(56) References Cited

U.S. PATENT DOCUMENTS

| 5,347,653 | A | * | 9/1994 | Flynn et al. .................. 707/695 |
| 6,445,822 | B1 | * | 9/2002 | Crill et al. ..................... 382/218 |
| 6,651,108 | B2 | | 11/2003 | Popp et al. |
| 6,662,225 | B1 | | 12/2003 | Motoyama et al. |
| 6,920,453 | B2 | * | 7/2005 | Mannila et al. ........ 707/999.006 |
| 7,162,635 | B2 | * | 1/2007 | Bisbee et al. ................ 713/176 |
| 7,281,020 | B2 | | 10/2007 | Fine |
| 2002/0010743 | A1 | * | 1/2002 | Ryan et al. .................... 709/205 |
| 2002/0012443 | A1 | | 1/2002 | Rhoads et al. |

(Continued)

FOREIGN PATENT DOCUMENTS

WO    WO 02/082271    10/2002
WO    WO 2004/040464    5/2004

OTHER PUBLICATIONS

Office Action Dated Jul. 9, 2009 From the Israeli Patent Office Re.: Application No. 168319 and Its Translation Into English.

(Continued)

*Primary Examiner* — Kenny Lin

(57) ABSTRACT

A method and a system for information management and control is presented, based on modular and abstract description of the information. Identifiers are used to identify features of interest in the information and information use policies are assigned directly or indirectly on the basis of the identifiers, allowing for flexible and efficient policy management and enforcement, in that a policy can be defined with a direct relationship to the actual information content of digital data items. The information content can be of various kinds: e.g., textual documents, numerical spreadsheets, audio and video files, pictures and images, drawings etc. The system can provide protection against information policy breaches such as information misuse, unauthorized distribution and leakage, and for information tracking.

172 Claims, 17 Drawing Sheets

U.S. PATENT DOCUMENTS

2003/0177187 A1 9/2003 Levine et al.
2004/0045010 A1 3/2004 Kondo et al.

OTHER PUBLICATIONS

Office Action Dated Dec. 31, 2009 From the Israeli Patent Office Re.: Application No. 168319 and Its Translation Into English.
Response Dated Jan. 14, 2010 to Official Action of Dec. 23, 2009 From the US Patent and Trademark Office Re.: U.S. Appl. No. 10/533,452.
Response Dated May 30, 2010 to Office Action of Dec. 31, 2009 From the Israeli Patent Office Re.: Application No. 168319.
Invitation Pursuant to Rule 62a(1) EPC and Rule 63(1) EPC Dated Jul. 7, 2010 From the European Patent Office Re. Application No. 03758641.9.
Response Dated Sep. 6, 2010 to Invitation Pursuant to Rule 62a(1) EPC and Rule 63(1) EPC of Jul. 7, 2010 From the European Patent Office Re. Application No. 03758641.9.
Office Action Dated Dec. 16, 2010 From the Israeli Patent Office Re.: Application No. 168319 and Its Translation Into English.
Supplementary Partial European Search Report Dated Oct. 13, 2010 From the European Patent Office Re. Application No. 03758641.9.
Requisition by the Examiner Dated Apr. 4, 2012 From the Canadian Intellectual Property Office Re. Application No. 2,504,680.
Response Dated May 15, 2011 to Office Action of Dec. 16, 2010 From the Israeli Patent Office Re.: Application No. 168319.
Communication Pursuant to Article 94(3) EPC Dated Dec. 19, 2011 From the European Patent Office Re. Application No. 03758641.9.

* cited by examiner

| UniqueID | Name | Title | Department | Reports_To |
|---|---|---|---|---|
| ID 0 | C. Hi-Ho | CEO | Research | ID 0 |
| ID 1 | S. C. Schief | Chief Scientist | IT | ID 0 |
| ID 2 | Victor P . Ito | V.P. of IT | QA | ID 0 |
| ID 3 | Q.A. Manny | QA Manager | Dev | ID 0 |
| ID 5 | Projio Mann | Project Manager | System | ID 0 |
| ID 6 | Syso Engee | System Engineer | Reaserch | ID 1 |
| ID 7 | D.Engee | Design Engineer | Reaserch | ID 1 |
| ID 9 | X. Signaly | Signal Researcher | IT | ID 2 |
| ID 12 | Tim Lider | Team Leader | IT | ID 12 |
| ID 13 | D. B. Hey | DBA | IT | ID 12 |
| ID 14 | P. Dilberto | Programmer | Dev | ID 24 |
| ID 15 | S. Willy | Programmer | System | ID 6 |
| ID 19 | Syso Adam | Sys . Admin . | QA | ID 3 |
| ID 21 | Mee Tu | Q.A. | QA | ID 3 |
| ID 22 | Que . Bay | Q.A. | Dev | ID 5 |
| ID 23 | E.. Softy | Software Engineer | Dev | ID 23 |
| ID 24 | E. Hardy | Hardware Engineer | | |

Fig. 10b

METHOD AND SYSTEM FOR MANAGING CONFIDENTIAL INFORMATION

RELATED PATENT APPLICATION

This application is a National Phase Application of PCT/IL03/00889 having International Filing Date of 28 Oct. 2003, which claims priority from U.S. Provisional Patent Application No. 60/422,128 filed 30 Oct. 2002.

FIELD OF THE INVENTION

The present invention relates generally to the field of managing and securing digital information. More specifically, the present invention deals with methods for classification, management and tracking digital information over the course of its lifecycle.

BACKGROUND OF THE INVENTION

The information and knowledge assets created and accumulated by organizations and businesses are of extreme value in the modern economical environment. As such, managing and keeping the information and the knowledge inside the organization and restricting its distribution outside, is of paramount importance for almost any organization, government entity or business and provides a significant leverage over its value. Most of the information in modern organizations and businesses is represented in a digital format that can be easily distributed via digital communication networks. However, ease of the promptness, comfort and information availability offered by these digital networks is accompanied by a constant hazard of information leak due to innocent mistakes, carelessness and malicious attempts to deliver non-public or otherwise confidential information to unauthorized entities. Information losses can cause anything from minor embarrassment to severe financial damage by enabling fraud and by causing loss of business secrets and consequent competitive advantage. In addition, such loss may expose the organization to legal sanctions and liabilities (e.g., under the US Gramm-Leach-Bliley act, the US Sarbanes-Oxley act, the US HIPAA privacy and security regulations, and directive 95/46/EC of the European Parliament). In order to exploit the value of information and commercial knowledge to as large an extent as possible, whilst mitigating risks that stem from unauthorized dissemination of information, the information distribution needs to be carefully and skillfully managed.

Managing information distribution includes several aspects, such as:

Making the information explicitly available to authorized persons so that they can utilize the information in order to create value for the organization.

Assuring that the information remains intact—i.e., that the integrity of the information is conserved.

Restricting the information distribution to authorized persons only—i.e., maintaining the confidentiality of the information.

Tracking the information along its lifecycle, in order to obtain a clear understanding of the information flow and to allow for adequate information retention practice.

Information assets in organizations and businesses evolve dynamically following their creation. During the evolution process, additional information and knowledge are created; added; destroyed; formats change; names change, etc. The process may have one, several or numerous contributors. Managing the information distribution along its lifecycle is therefore an involved task. In some cases, the information is relevant only within a limited time-window, and the value of the information sharply decreases after some time. E.g., the information that is relevant for predicting the price of a certain commodity at a certain time, becomes steadily less valuable as the time gets closer. In other cases, the information represents accumulated knowledge. In this case, the merit of the information may even increases with time. This state of affairs further complicates the information-management task.

Methods that attempt to track digital information and manage information distribution exist. Some of these methods utilize file meta-data, which may not be robust against changes in the file format. Other methods utilize keywords-based classification, which tends to be either over-exclusive or over-inclusive. Other methods restrict information usage and distribution to particular kinds of applications, commonly referred to as Digital Right Management (DRM) applications. DRM applications have the disadvantage that they hamper normal workflow and require large to massive investment levels. Still other methods consider the binary signature of the file, but this has the disadvantage of depending critically on the precise representation of the data.

The above methods thus do not provide an adequate solution to the problem of modern businesses for the reasons outlined above. The large number of formats in which the same information can be represented, the large number of applications that can use the same information in different ways, the large numbers of kinds of storage that the information can be kept in, and the large number of information distribution channels types, tend to render any given method ineffective over a business environment taken as a whole. File metadata is often altered when the format of the file or the storage medium of the data is changed. Binary digital signature is of zero-tolerance to any changes in the signed data, and keyword or key-phrase based tracking cover only a very limited aspect of the problem.

Methods for screening and filtering of digital content also exist and are widely used, in order, for example, to allow censorship of offending material (e.g., pornography). These methods lack the resolution needed for effective policy definition and enforcement, and tend to be over exclusive or over inclusive, Methods that utilize sophisticated searching algorithms in databases and over the Internet also exist. These methods are optimized for information retrieval and for providing answers to specific queries, and, in general, cannot provide either for effective tracking of specific information items or for effective policy enforcement.

Another issue that further complicates the monitoring process is the so-called template document. In many cases, documents are derived from template type source documents, for example standard contracts. In these cases, the ability to monitor and track various different documents that are derived from the same or a similar source template cannot be based on any naïve notion of resemblance between the documents, since two documents that are derived from the same/similar template may be, on one hand, very similar, while, on the other hand, the differentiating details, such as the names of the sides of the contract, may be of considerable importance. Tracking different derivatives of a template document is not adequately addressed by current methods.

There is thus a recognized need for, and it would be highly advantageous to have, a method and system that allow information tracking and information distribution management along the information life cycle, which overcomes the drawbacks of current methods as described above.

SUMMARY OF THE INVENTION

According to a first aspect of the present invention, a method and a system for information management and control is presented, based on modular and abstract description of the information. The system allows for a flexible and efficient policy management and enforcement, where a policy can be defined with direct respect to the actual information content of the digital data items. The information content can be of various kinds: e.g., textual documents, numerical spreadsheets, audio and video files, pictures and images, drawings etc. The system can provide protection against information policy breaches such as information misuse, unauthorized distribution and leakage, and for information tracking.

As a first step in practicing the invention, elementary information units are defined. These elementary information units may be sentences, sequences of words, sequences of characters, numbers, graphs, vectors, matrices, pieces of raw data, images, etc. The system then assigns representation-independent identifiers and indices for each elementary information unit. An information object that consists of one or more information units is thereafter defined by the system. For example, a textual document can be considered as an information object, and various sequences of words are considered as the basic information units. Within the context of this invention, an information object is the basic ingredient on which a policy is defined. A simple information object is an information object that can be described as a concatenation of one or more basic information units, while a compound information object is an information object that consists of two or more simple information objects, possibly together with the information needed for their combination (e.g., a textual document with an embedded numeric worksheet). An information class is the set of all information objects on which precisely the same policy is defined. An instance of an information object is a specific representation of the information object, e.g., an instance of the information object describes a certain text may be a file that contains the said text in a MS-Word format.

In a preferred embodiment of the present invention, the information evolution process is preferably described by a directed graph, where the nodes in the graph represents information objects, and two nodes are connected by a vertex if and only if one of the two nodes share a fraction of basic information units that is greater then a certain threshold.

In another preferred embodiment of the present invention, the system monitors and/or controls the traffic in computer networks, the access to and storage of information in storage elements and the usage of information by applications and their users, in order to identify and/or classify information objects and to assign or enforce a policy in accordance with the content of the information objects. The policy may contain one or more restrictions on the usage of the information object.

In another preferred embodiment of the present invention, the system extracts a descriptor for each information object, based on statistical analysis of the information objects.

In a preferred embodiment of the present invention, the limitations on the usage of the information object comprise limitations to at least one of the following:
  viewing the information object;
  changing the information object's format;
  changing the information object representation;
  changing the information object properties;
  editing the information object;
  transferring the information object;
  storing the information object;
  printing the information object;

In a preferred embodiment of the present invention, the defined policy also includes adding forensic information to the content, e.g., by adding a unique textual watermark per instance or group of instances of the information objects.

In a preferred embodiment of the present invention, the defined policy also includes replacing some of the content with other content.

In another aspect of the present invention, the identifiers depend only on the content of the elementary information units, and not on their location in the information object.

In a preferred embodiment of the present invention, the identifiers of the basic information units and the information objects are stored in a database.

In another preferred embodiment of the present invention, the information objects are clustered according to their relative distances, and a default policy is assigned to each cluster.

In another preferred embodiment of the present invention, the distance between the information objects is an edit distance, described, e.g., in U. Manber: Introduction To Algorithms: a Creative Approach, pp 155-158, Addison-Wesley publishing company, 1989, ISBN 0-201-12037-2, the contents of which are hereby incorporated by reference. In this case, the elementary symbols used for evaluating the edit distance are information units.

In another preferred embodiment of the present invention, the distances between identifiers of the elementary information units takes into consideration their semantic differences, such that if two elementary information units has the same semantic meaning, their identifiers will be the same.

In another preferred embodiment of the present invention, the information is inspected in one or several locations within a computer network.

In another preferred embodiment of the present invention, an inspection point is located on an internal mail server.

In another preferred embodiment of the present invention, an inspection point is located in a file server.

In another preferred embodiment of the present invention, an inspection point is located in a proxy server.

In another preferred embodiment of the present invention, an inspection point is located in a database, or database accessing utility/server.

In another preferred embodiment of the present invention, an inspection point is located in an application.

In another preferred embodiment of the present invention, an inspection point is located in the operating system.

In another preferred embodiment of the present invention, an inspection point is located in the file system.

In another preferred embodiment of the present invention, an inspection point is located on an external mail server.

In another preferred embodiment of the present invention, the system monitors transformation of information objects via instant messaging applications.

In another preferred embodiment of the present invention, the system utilizes a SOCKS server (a widely-used circuit level gateway), or an equivalent, in order to monitor instant messaging transportation, and to analyze the captured messages.

In another preferred embodiment of the present invention, the system attempt to capture and analyze files transferred via instant messaging services. This is done by analyzing the file transfer message sent by the instant messaging server, locating the address (e.g., IP address) and relaying the transport on behalf of the participant that send the file.

In another preferred embodiment of the present invention, the system constructs default groups based on content identification. The groups are preferably constructed based on former usage involving information objects with similar characteristics.

In another preferred embodiment of the present invention, the system utilizes methods that are resilient to deliberate attempts to change the apparent content of the information, by creating identifiers that are invariant to at least some of the transformations in the information objects.

In another preferred embodiment of the present invention, the system contains a module operable to detect cases in which the information object has been subjected to manipulation in order to avoid its detection, classification or identification.

In another preferred embodiment of the present invention, the system contains a module operable to handle various documents that are derived from the same templates (e.g., standard contacts). The template documents are stored in a special database as information objects. Each document that is derived from a given template document is treated as a compound information object, that is it comprises template information and structure from the template information object as well as one or more information objects that represent the additions or changes from the basic template document. The template information object preferably contains the minimal number of elementary information units that are presented in all the documents that are derived from the said template.

In another preferred embodiment of the present invention, the system allows automatic inheritance of a template's policy to a derived information object.

In another preferred embodiment of the present invention, the system allows automatic classification of the information as per belonging to a domain of knowledge.

In a preferred embodiment of the present invention, the system allows for a default policy to be applied on information objects on which no previous policy was defined. The policy is preferably also based on the domain of knowledge to which the said object belongs.

The various unique identifiers of the information units are preferably stored in a database. The order in which the identifiers are presented in the document can also be stored, in order to allow for better detection and identification.

In another preferred embodiment of the present invention, the policy can be defined in a manner that allows a user to view/access/manipulate/copy/transfer/print only selected information objects that are parts of the compound information object. In this case, the system preferably utilizes a mechanism that enables to maintain the coherency of the text.

In another preferred embodiment of the present invention, the system utilizes identification methods based on the edit distance between information objects, where the basic sequence on which the edit distance is evaluated is a subset of the sequence of identifiers of the elementary information units.

In another preferred embodiment of the present invention, the number of identifiers of the elementary information units is reduced by performing a random filtering or other filtering method.

In another preferred embodiment of the present invention, the identification is based on a list of salient words or elementary units, that are selected in a manner that ensures that every portion of the text that is larger then a certain threshold is covered, i.e., contain at least one word from the list.

In another aspect of the present invention, the system scans for pre-designated information objects in storage devices, such as the user's hard-disks, by utilizing client software.

In another aspect of the present invention a method and a system for knowledge management and control is presented, based on modular and abstract description of knowledge. In this case, the elementary units are denoted as facts. As a first step in practicing the invention, elementary facts (EF) are defined. These elementary facts may be represented as sentences (e.g., "Mr. John Doe earned 65000$ in 2001"), as entries to a database etc. The system then assigns representation-independent identifiers and indices for each elementary fact. A knowledge object consisting of one or more facts is thereafter defined by the system. For example, a set of facts about Mr. John Doe can be considered as a knowledge object. Within the context of this aspect of the present invention, a knowledge object is the basic ingredient on which a policy is defined. A simple knowledge object is a knowledge object that can be fully described as a set of elementary facts, while a compound knowledge object is a knowledge object that consists of two or more simple knowledge objects. A knowledge class is the set of all knowledge objects on which precisely the same policy is defined. An instance of a knowledge object is a specific representation of the knowledge.

In another aspect of the present invention, the system allows authorized persons to override any automatic decision of the system.

In another aspect of the present invention, a personalized watermark is added to any instance of the information objects while being distributed to the various recipients.

In a preferred embodiment of the present invention, the system performs extensive logging of all the events and the operations performed on selected information objects along the information lifecycle.

According to another aspect of the present invention there is provided a method for information identification comprising:

finding elementary information units within said information object; and deducing information about the identity of said information object from identification of said elementary information units found within said information object.

According to a further aspect of the present invention there is provided a method for changing automated computerized exchange of information within an information object having overall coherency, the method comprising selecting amongst and carrying out at least one of the following:

deleting part of said information;

replacing part of said information; and inserting an additional part to said information, wherein said carrying out additionally comprising comprises the preservation of the coherency of said information within said information object.

Preferably, said changing of said information object is done in order to eliminate parts having policies that do not allow for said at least one action to be executed while they are in the document.

In an embodiment, said changing of said information object is carried out in order to personalize said information object.

Preferably, said changing of said information object is carried out in order to customize said information object for a specific use.

In an embodiment, said changing of said information object is done in a manner selected to achieve at least one of the following preserving said coherency comprises at least one of:

preserving the coherency of said information object; maintaining seamlessness; preserve preserving the structure of said information object; preserving the linguistic coherency of said information object; preserving the formatting style of said information object; and preserve the pagination style of said information object.

Preferably, said information objects comprise compound information objects and wherein said changing of said information object is made to constituent parts of a compound information object.

The method may be carried out over a network having users with different access rights to said information object, said selecting and carrying out being to adapt said information object to conform to access rights of a one of said users to whom said information object is released.

According to a further aspect of the present invention there is provided apparatus for automatic information identification to enforce an information management policy on information objects, the apparatus comprising:

a scanning module for finding elementary information units within said information object; and a deduction module for deducing information about the identity of said information object from identification of said elementary information units found within said information object, said deduced identity being usable to obtain a corresponding policy rule for applying to said information object.

In an embodiment, said information objects comprise at least one simple information object, said simple information object comprising one of the following:

an elementary information unit;

a set of elementary information units; and an ordered set of elementary information units.

Preferably, said elementary information units comprise at least one of the following:

a sentence; a sequences of words; a word; a sequence of characters; a character; a sequence of numbers; a number; a sequence of digits; a digit; a vector; a curve; a pixel; a block of pixels; an audio frame; a musical note; a musical bar; a visual object; a sequence of video frames; a sequence of musical notes; a sequence of musical bars; and a video frame.

Preferably, said deduction module is further configured to assign elementary information unit identifiers to elementary information units after identification.

Preferably, said deduction module is further configured to utilize said elementary information unit identifiers in said deducing.

In an embodiment, said information object identification is carried out on an instance of said information object, said information object instance being said information object in a specific format.

Preferably, said deduction module is configured to provide said elementary information unit identifiers in a manner determined at least partly by the content of said elementary information units which they are assigned to.

In an embodiment, said elementary information unit identifiers are solely determined by said content.

Preferably, said deduction module is configured to provide said elementary information units identifiers in a manner at least partly determined by locations within an information object of respective elementary information units to which they are assigned.

Apparatus according to the invention may include a policy attachment unit associated with said deduction module, said policy attachment unit being configured to use said deducing to attach to said information object an information object policy, said policy comprising at least one of the following:

an allowed distribution of said information object;

a restriction on distribution of said information object;

an allowed storage of said information object;

a restriction on storage of said information object;

an action to be taken as a reaction to an event;

an allowed usage of said information object; and a restriction on usage of said information object.

Preferably, said deducing comprises utilizing conditional probabilities for at least one of the following:

identification of information objects;

classification of information objects; and identification of a knowledge domain of information objects.

According to a further aspect of the present invention there is provided apparatus for automated computerized exchange of information within an information object having overall coherency, the apparatus comprising a selector for selecting amongst at least one of the following data modifications:

a deletion of part of said information;

a replacement of part of said information; and an insertion of an additional part to said information, the apparatus further comprising a data modification unit associated with said selector for carrying out said selected modification within said information object, said data modification unit being associated with a coherency retention module for detecting coherency features of said information object and altering said modification in order to preserve said detected coherency features within said information object.

According to a yet further aspect of the present invention there is provided apparatus for automatic information identification of information objects, the apparatus comprising:

a scanning module for finding elementary information units within said information object; and a deduction module for deducing information about the identity of said information object from identification of said elementary information units found within said information object, said deduced identity being usable for controlling use of said information object.

Preferably, said deduction module is further configured to assign elementary information unit identifiers to elementary information units after identification.

The present invention successfully addresses the shortcomings of the presently known configurations by providing a method and system for robust tracking and management of information and knowledge, which can efficiently serve digital information management, audit and control.

BRIEF DESCRIPTION OF THE DRAWINGS

For a better understanding of the invention and to show how the same may be carried into effect, reference will now be made, purely by way of example, to the accompanying drawings, in which.

DETAILED DESCRIPTION OF PREFERRED EMBODIMENTS

Figure 1:
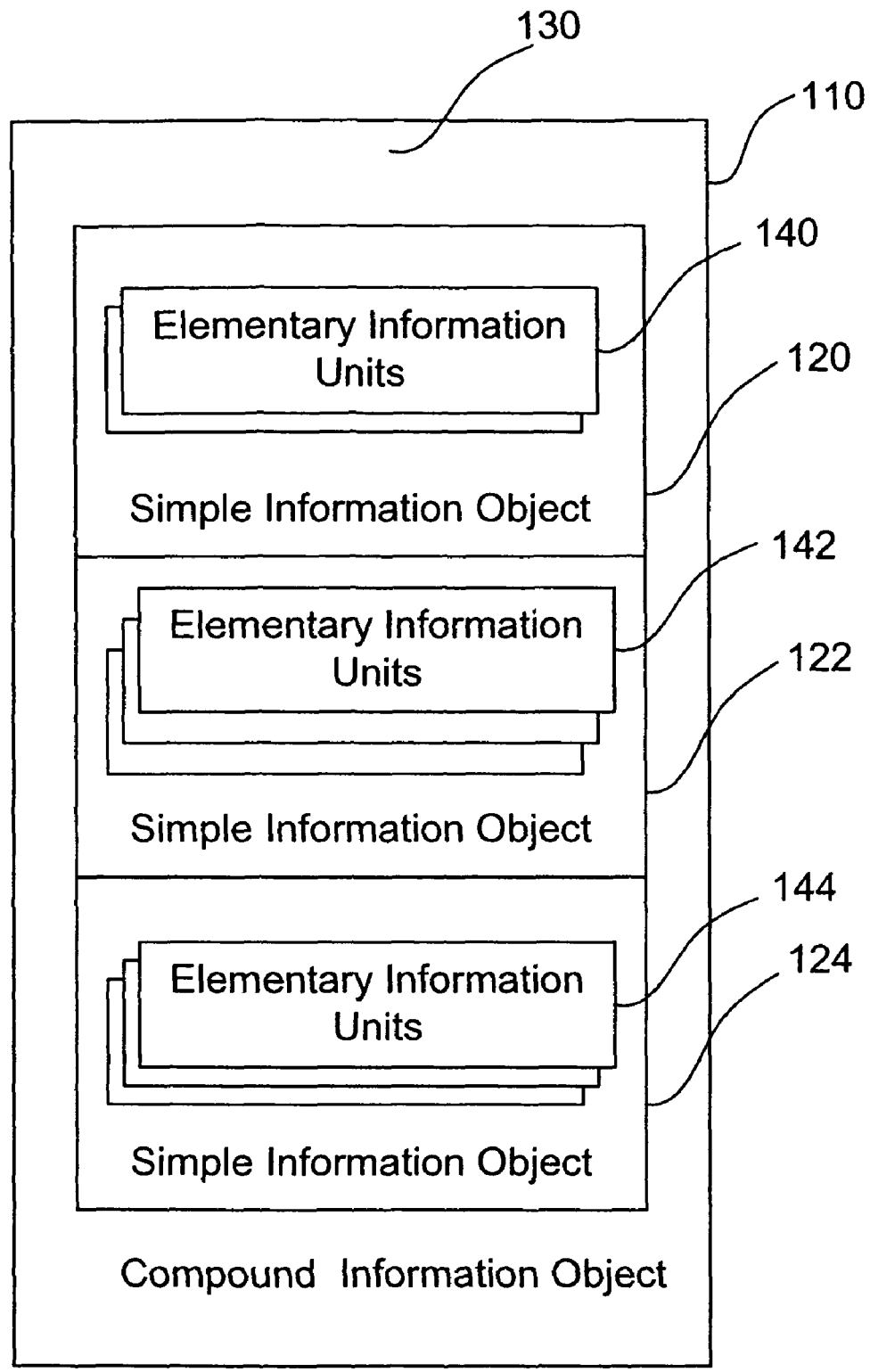
FIG. 1 is a simplified schematic diagram illustrating a compound information object constructed from three simple information objects, in accordance with a preferred embodiment of the present invention.

The present embodiments describe a method and system for managing confidential information. In particular, the present invention described methods for information tracking, identification, classification and management along the information lifecycle, utilizing a modular and abstract description of information.

According to embodiments, a system for information management and control is presented which uses modular and abstract descriptions of the information. The system allows for flexible and efficient policy management and enforcement, in which a policy can be defined with direct respect to the actual information content of the digital information items. The information content can be of various kinds: e.g., textual documents, numerical spreadsheets, audio and video files, pictures and images, drawings etc. The system can provide protection against information leakage independently of other information management systems.

Before explaining in detail preferred embodiments of the present invention, the following terminology and nomenclature are introduced:

Canonization: transformation of digital data into a standard format. E.g., transforming of textual documents in various formats to plain text in a Unicode format. In order to be able to infer information regardless of the format, it is preferable to canonize the input data.

An elementary information unit (EIU) is a piece of (preferably canonized) information to which a unique identifier is assigned. These elementary information units may be sentences, sequences of words, sequences of characters, sequences of frames in a video content, segments of audio files etc.

An information object (IO) consists of one or more information units. For example, a textual document can be considered as an information object, and various sequences of words are considered as the basic information units. Within the context of this invention, an information object is the basic ingredient on which a policy may be defined.

A simple information object (SIO) is an information object that can be fully described as a concatenation of basic information units (possibly with overlaps). For example, a paragraph in a textual document, a drawing or a "cut" in a film can be considered as a simple information object.

A compound information object (CIO) is an information object that consists of an aggregation of two or more information objects (e.g., a textual document with an embedded numeric worksheet), together with the information that is needed for their combination. The aggregation can be hierarchical: a compound information object can be constructed by an aggregation of other compound information objects, which in turn are constructed by an aggregation of other compound information objects, etc.

An information class is the set of all information objects on which precisely the same policy is defined.

An instance of an information object is a specific representation of an information object, e.g., a file that contains a certain textual document in a MS-Word format.

A User is an agent who accesses and/or manipulates and/or distributes the managed information.

A Users group is a collection of users for which a certain policy can be defined.
  A Member based group: is described by elaborating all the members.
  A Property based group: is defined by a property or a rule that applies to a property of the users, e.g.,
    Organization or organizational department.
    Geographical location (e.g., a certain campus)
    Business category: (e.g., clients, suppliers, etc.)
  Groups union: users belong to at least one of the groups in a list of groups.
  Complementary group: all the users that are not in a certain group. I.e., everyone except the customers.
  Group intersection: the set of users that belong to all of the groups in a list.
A group can contain other groups, as well as users, as members.
A Content group: the collection of all the contents on which a certain policy is defined.
  Member based group: described by elaborating all the identifiers of the contents in the group.
  Property based group: defined by a property or a rule that applies to a subset of the organizational content, e.g.,
    Format (Word, PDF, etc.)
    Template content.
    Classification (top secret, secret, confidential)

Importance

Information types—legal, financial

Allowed recipients

Limitation name (not for laptops, Top management)

Groups union: contents belong to at least one of the groups in the unions.

Complementary group: all the contents not in a certain group. I.e., everyone except the costumers.

Group intersection: the set of contents that belongs to all the intersecting groups.

As above, a group can contain other groups as members.

An owner: A user or a group of users that are allowed to define and/or to change a policy with respect to a certain content and/or a content groups that he/she owns. Many times, the owner is the author of the document. Owner is a property associated with a document, the owner authorization may be defined by rules defined based, at least partially on that property, the owner of a document may be defined according to a rule based on the event of the initial signing (creation with respect to the policy system) of the document.

A policy assigned to an information object comprises of one or more rules, which determine the limitations and restrictions with respect to usage and distribution of the said information object.

A rule within a policy is a function that maps an event, together with the relevant parameters, to an action.

An Event is a trigger that initiates execution of a predefined policy. An event is specified by an event type and event parameters.

An Action: is a sequence of one or more steps executed according to the event, the policy and the user.

A role of an entity, with respect to the policy assigned an information object, determines the set authorizations given to that entity. The entity can be a user or a computerized system. The role may, e.g., allow the entity to override a policy assigned to an information object by some of the other entities.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

Reference is now made to FIG. 1, which is a simplified schematic diagram illustrating a compound information object comprising lower-level information entities according to a preferred embodiment of the present invention. The compound information object 110 comprises three simple information objects: 120, 122 and 124, and further uses auxiliary information 130. Each simple information object in turn comprises a concatenation of elementary information objects (140, 142 and 144).

Figure 2:
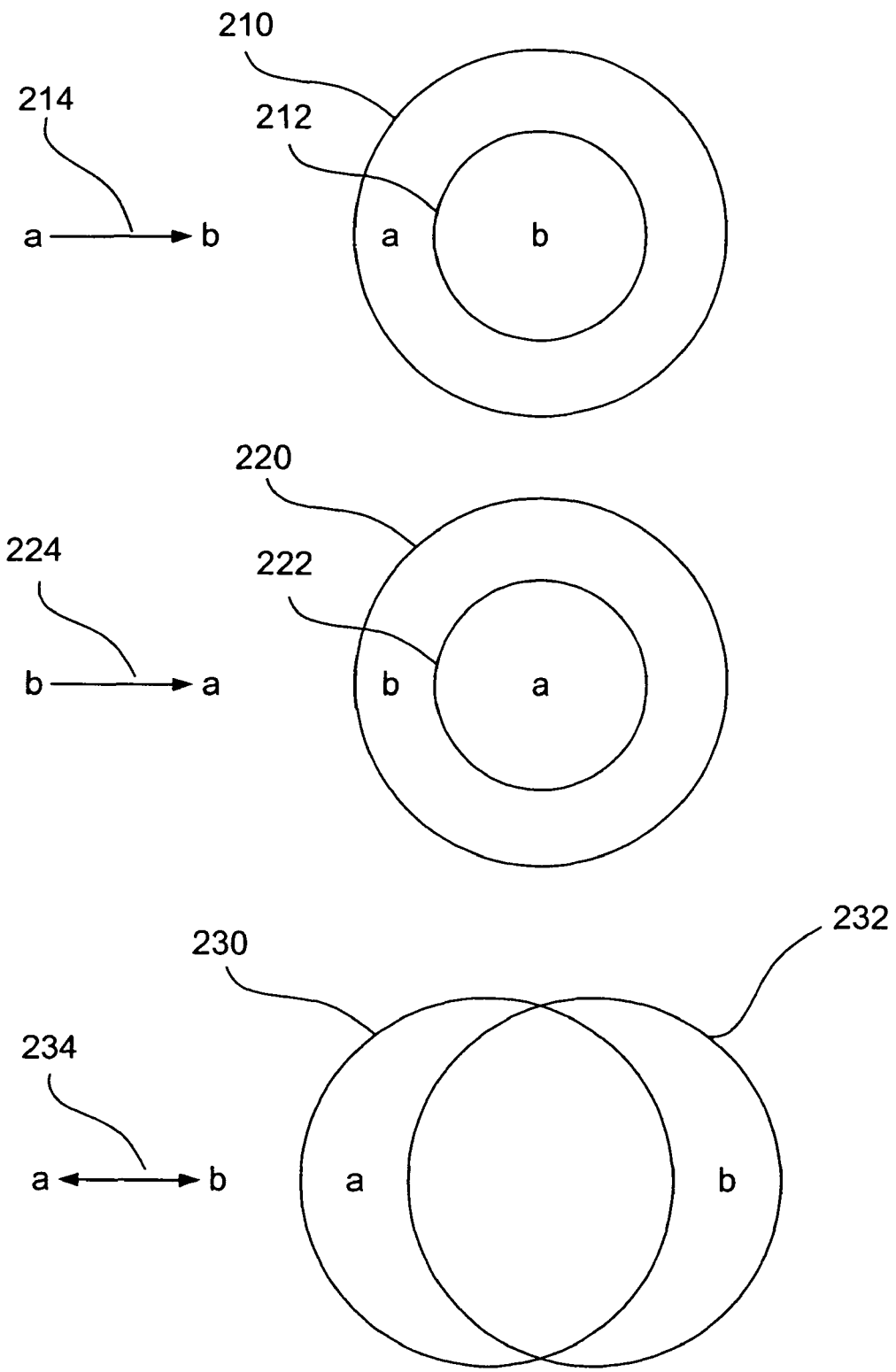
FIG. 2 is a simplified schematic diagram illustrating notation for constructing a directed edge in a graph, constructed and operative in accordance with a preferred embodiment of the present invention.
Figure 3:
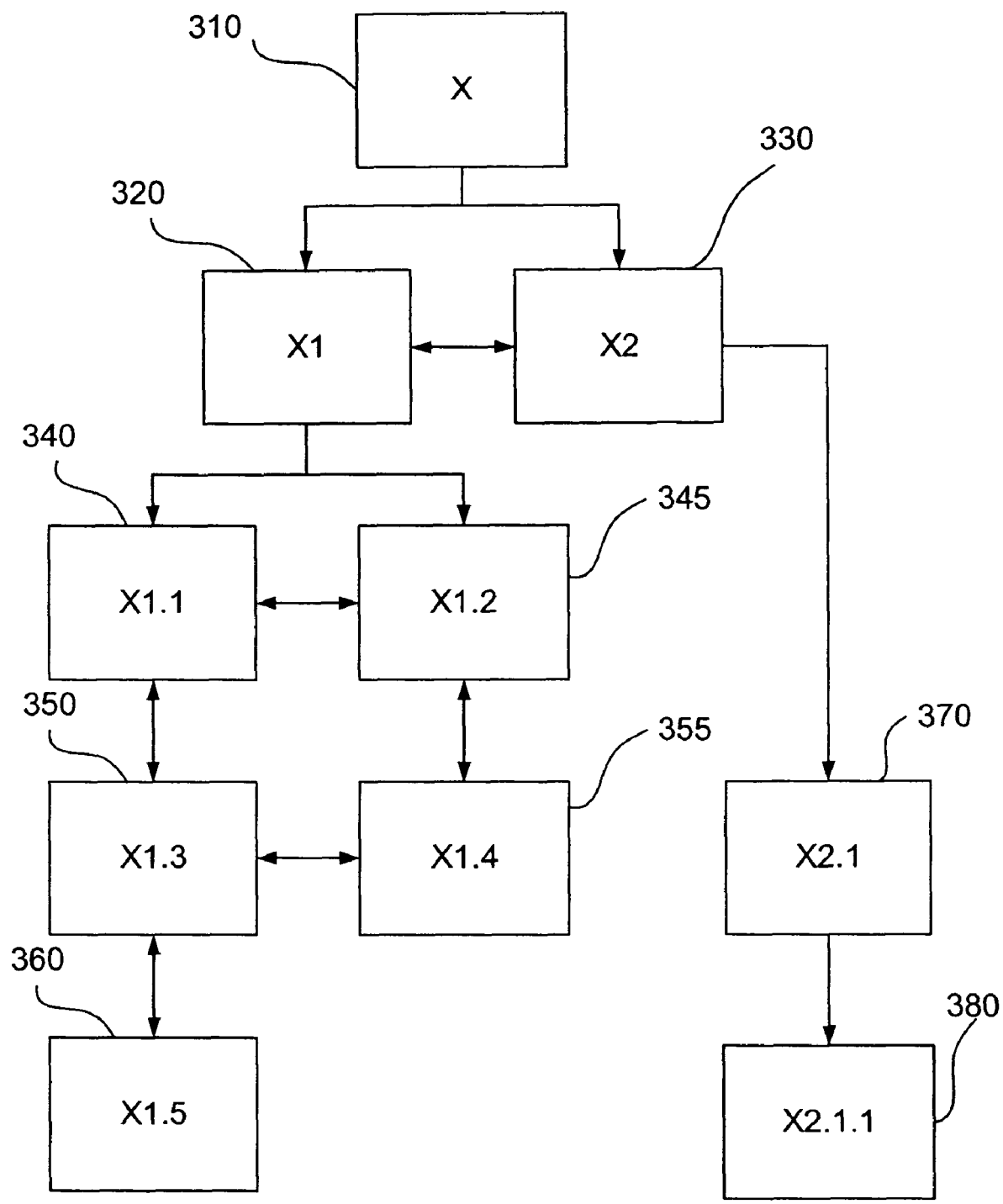
FIG. 3 is a simplified graphical representation of the evolution process over time of an information object.
Figure 4:
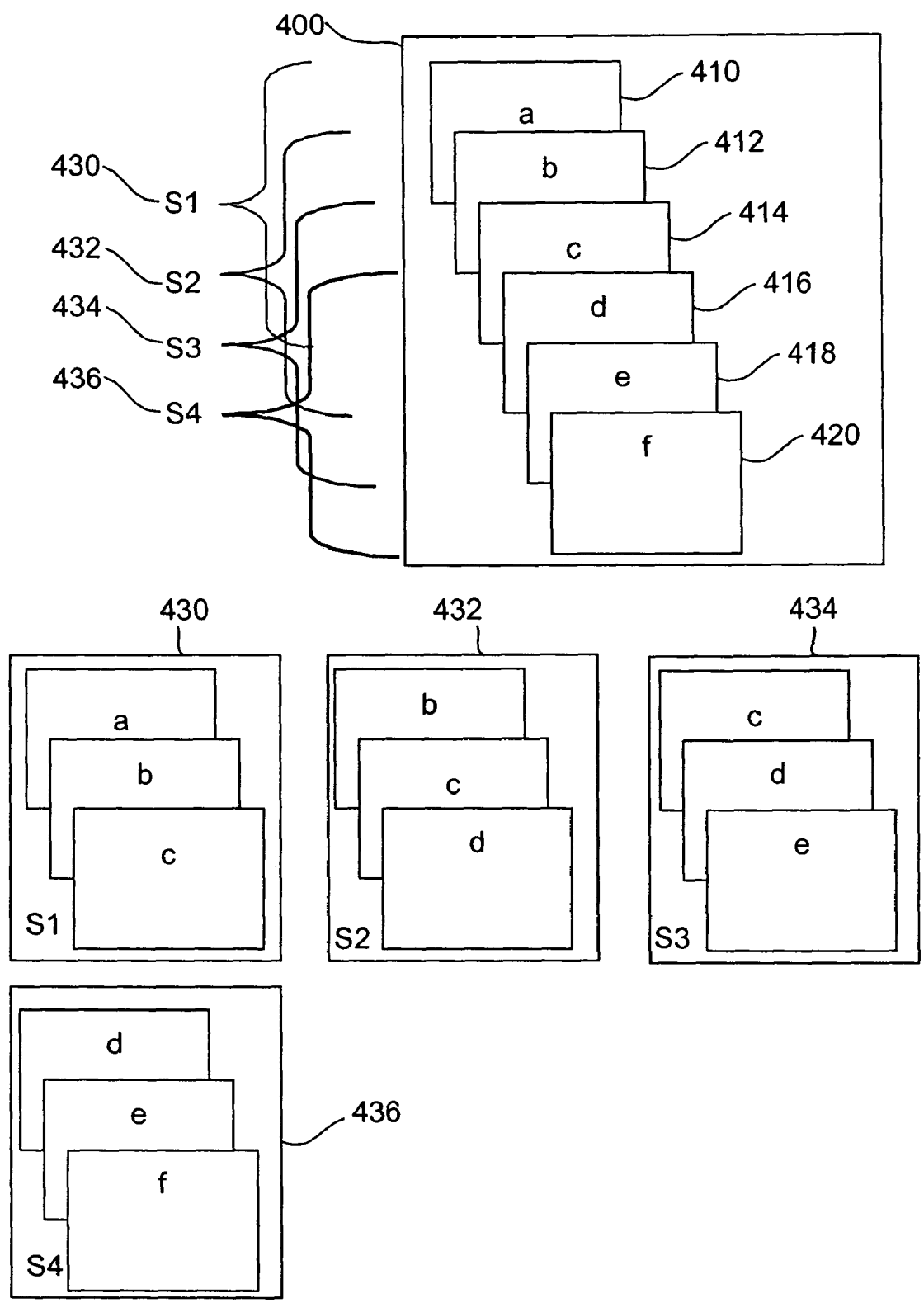
FIG. 4 is a simplified schematic diagram depicting the representation of information objects using elementary information units, in accordance with a preferred embodiment of the present invention.

The information evolution process is preferably described by a directed graph, where the nodes in the graph represent information objects. FIG. 2 illustrates the notation for constructing a directed edge in the graph. If the information object a 210 contain all the elementary information units that exists in the information object b 212, then the node a will be connected to the node b with an edge directed from a to b (FIG. 2a) and vice versa (FIG. 2b). If the two nodes share a fraction of elementary information units that is greater then a certain threshold then a vertex connects the two nodes is described by a bi-directional edge. (FIG. 2c) FIG. 3 is a simplified graphical representation showing an evolutionary process of an original information object X 310. From an original information object X 310 two versions, X1 320 and X2 330 are derived. These versions are subsets of the original object, and there is therefore an edge directed from X 310 to X1 320 and X2 330. X1 320 and X2 330 share a substantial quantity of elementary information units, and there is therefore a bi-directional edge between X1 320 and X2 330. From X1 two basic versions are derived, X1.1 340 and X1.2 345, and there is therefore an edge directed from X1 320 to X1.1 340 and to X1.2 345. The derivations, again, share a substantial amount of elementary information units, so there is another bi-directional edge between X1.1 340 and X1.2 345. X1.3 350, and X1.4, 355, are versions of X1.1 340 and X1.2 345, respectively, but instead of being merely subsets of X1.1 340 and X1.2 345, they also contain additional information units, which are not presented in X1.1 340 and X1.2 345. There is therefore a bi-directional edge between X1.1 340 and X1.3 350, and a bi-directional edge between X1.1 340 and X1.3 350, Similarly, X1.5 360 is a version of X1.3 350. In this case, some information units have been subtracted and some information units have been added. X2.1 370 is derived from X2 330, and contains a subset of the elementary information units of X2 330, and there is therefore an edge directed from X2 330 to X2.1 370. X2.1.1 380 is in turn derived from X2.1 370. X2.1.1 380 again, contains only a subset of the information units of the object from which it derives, and there is therefore an edge directed from X2.1 370 to X2.1.1 380. Note that in order to provide robustness, the description of an information object in terms of basic information units contains, in general, a high level of redundancy, and there should preferably be provided a considerable overlap between elementary information units that are used to describe an information object: e.g., if the information object is a "cut" of a video content, the elementary information units may be overlapping sequences of frames. Reference is now made to FIG. 4 which is a simplified diagram schematically illustrating such a state of affairs: an information object 400 is composed of the elements a 410, b 412, c, 414, d, 416, e, 418, and f, 420. These elements can be words in a text object, frames in a video objects etc. The elementary information units are sequences of elements: the elementary information unit S1 430 comprises the sequence a 410, b 412 and c, 414, the elementary information unit S2 432 comprises the sequence b 412, c 414 and d, 416, the elementary information unit S3 434 comprises the sequence c 414, d 416, and e 418 and the elementary information unit S4 436 comprises the sequence d 416, e 418 and f 420. The information object can therefore be described as a simple concatenation of S1 430 and S4 436.

A policy with respect to a compound information object may also be compound, such that a different policy will be assigned to each of the simple objects that constitute the compound information object. For example, one simple information object from the set of information objects that constitutes the compound information object may be classified "confidential", while another information object may be classified as "public".

Figure 5:
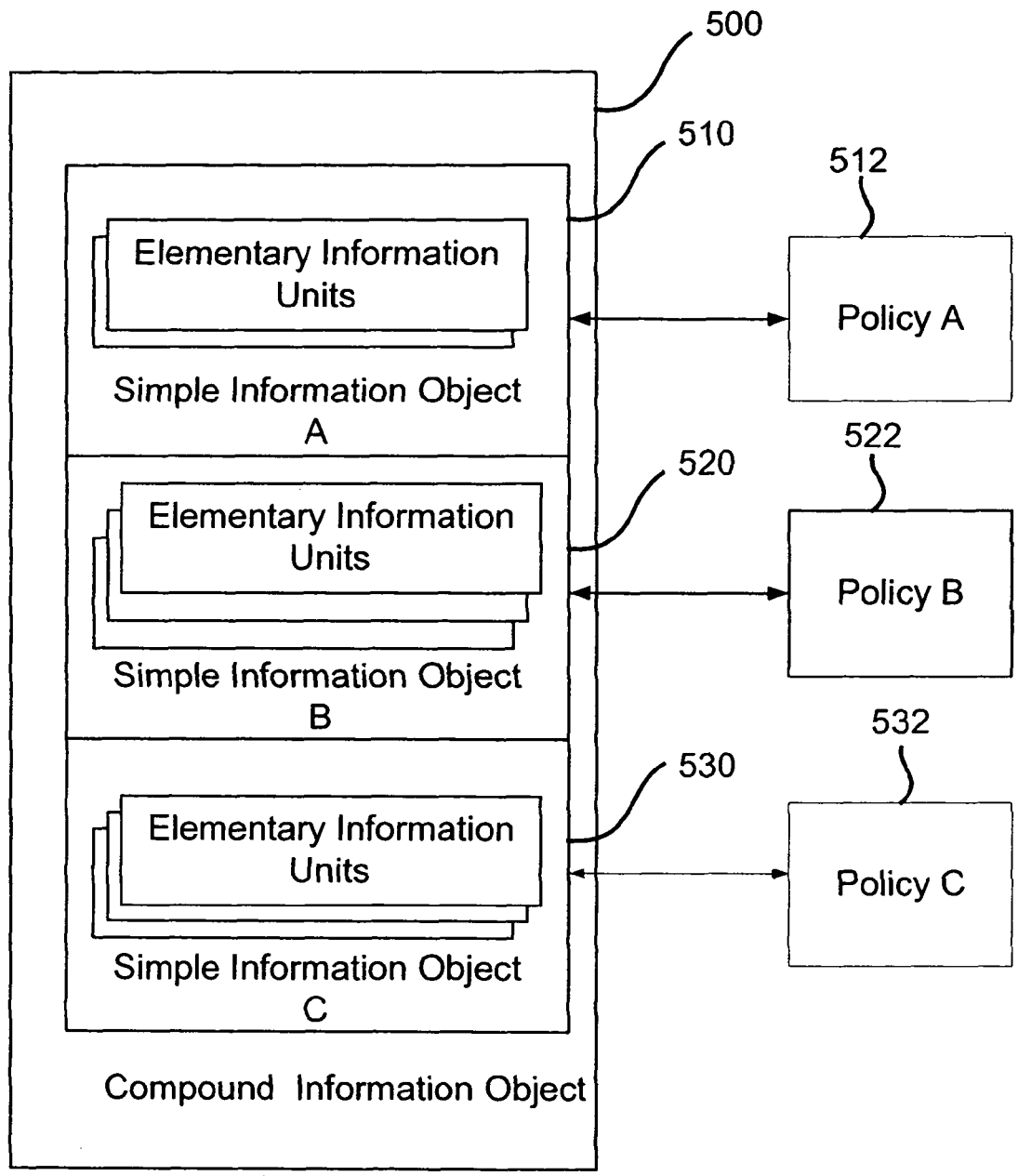
FIG. 5 is a simplified schematic diagram illustrating one-to-one correspondence between information objects and policies, according to a preferred embodiment of the present invention.

Reference is now made to FIG. 5, which illustrates one-to-one correspondence between information objects and policies, according to a preferred embodiment of the present invention. Compound information object 500 contains the simple information object A 510, to which policy X 512 applies, the simple information object B 520, to which the policy Y 522 applies, and the simple information object C 530, to which the policy Z 532 applies. It is noted that a policy may comprise ignoring a given object, or may include any kind of default behavior. The policy can therefore also be defined as a property of the information object. The policy can be a simple rule (e.g., "can be viewed only by X, Y, and Z") or a complete set of rules, determining restriction on the usage imposed on the various members in the organization.

Such rule based policy may be group or logic based, attaching a complete policy or a policy element (i.e., a directive which is a part of a policy) to a Boolean expression, such that the policy or policy element is enforced on all transactions which satisfy the expression. This expression may be composed of variables whose value is determined by outside Boolean functions (such as membership in a group, time based functions, etc.). An equivalent implementation may be based on group membership. In a preferred embodiment of the present invention, some of the expressions are defined as lazy expressions, and are not evaluated as soon as it gets bound to a variable, but only when something forces the evaluator to produce the expression's value. The latter allows for a more efficient implementation.

In another preferred embodiment of the present invention, a language, resembling a programming or scripting language, is used to define an ordered calculation that results in a policy. The ordered calculation may directly result from the language, or may be inferred from a hierarchy of calculation dependencies.

In a preferred embodiment of the present invention, a policy is assigned to selected nodes in the graph, and nodes may inherit the policies assigned to their predecessors.

In another preferred embodiment of the present invention, a notion of distance or similarity/dissimilarity is defined between any two of the information objects. According to a preferred embodiment of the present invention, the similarity measure between information object A and information object B is based on the parts that are common between the two objects. For example, if the information object A is described by 400 elementary information units, and the information object B is described by 500 elementary information units, out of which 300 elementary information units are common to A and B, then the similarity between A and B is 300/400=0.75, and the similarity between B and A is 300/500=0.6.

In another preferred embodiment of the present invention, the system utilizes an identification method based on the edit distance (described, e.g., in Manber referred to above) between information objects, where the basic sequences on which the edit distance is evaluated are sequences of identifiers of the elementary information units. For example, if the identifiers of one sequence are A B C and D and the identifiers of the second sequence are A B E C D, then the distance is "1 insert".

In another preferred embodiment of the present invention, the distances between identifiers of the elementary information units take into consideration their semantic differences, such that if two elementary information units have the same semantic meaning, then the two elementary objects share the same identifier. In a preferred embodiment of the present invention considering of semantic content is performed by mapping all synonymous words to the same numerical identifier, such that replacing a word with its synonym would not alter the numerical representation of the word. In another preferred embodiment of the present invention, the identifiers of elementary information units are invariant also to reordering of words.

In another preferred embodiment of the present invention, identifiers are based on embedding the elementary information units in a Euclidean space in a manner that approximately preserves the pairwise semantic distances between the elementary information units. The embedding process can utilize a method such as the one described in N. Linial, Y. Rabinovich: The Geometry of Graphs and Some of its Algorithmic Applications. *Combinatorica* 15(2): 215-245, 1995, the contents of which are hereby incorporated by reference.

In another preferred embodiment of the present invention, the information objects are clustered, using a clustering method that utilizes the pair-wise distances, or any other dissimilarity measure, between information objects. In this case, users may assign a policy to one or more representative objects in each cluster, and a default policy is assigned to all the objects in the cluster based on the policy assigned to the representative objects. This method can be used for automatic creation of default groups. Methods for clustering using a measure of similarity and/or dissimilarity between pairs of objects or for clustering of nodes in a directed graph, such as the graph depicted in FIG. 2, are known and described e.g., in R. O. Duda, P. E. Hart and D. G. Stork: Pattern Classification (2nd Edition), John Wiley & Sons, Inc. 2001, ISBN 0-471-05669-3, the contents of which are hereby incorporated by reference.

In another preferred embodiment of the present invention a default policy is assigned to information objects according to the policy assigned to its neighbors, e.g., using the "n nearest-neighbors rule" described, e.g., in Duda et al referred to above. This requires defining a measure of similarity/dissimilarity between information objects, e.g., using the similarity/dissimilarity measure described above.

An information closure is a clique in the graph, i.e., a group of nodes such that each node is connected to all the other members in the group. Because of the similarity within an information closure, it is likely that the policies regarding its constituents are similar or even equal. Furthermore, it is also likely that exact identification of a document as being similar to a single node in the clique may be a relatively hard task. Therefore, in another preferred embodiment of the present invention, there is an option to define a default policy for the clique to be applied to any case where an information item has been identified to be part of the clique but cannot be matched to any single node. Such a default policy may be defined explicitly, or implicitly based on the common ground of the policies defined for the individual clique nodes.

In another preferred embodiment of the present invention, the system extracts a descriptor for each information object, based on a series of unique identifiers for each elementary information unit. The extracted identifiers can be based on a hash function derived from a numerical representation of the elementary information unit. Thus, in a case in which information units are textual, a numeric representation of the text can be based on the ASCII or Unicode representation of the characters.

In another aspect of the present invention, the identifiers depend only on the content of the elementary information units, and not on their order or location in the information object.

In a preferred embodiment of the present invention, the identifiers of the basic information units and the information objects are stored in a database, in a manner that allows efficient retrieval. This way, the system can efficiently utilize the identifiers in order to compare stored identifiers with identifiers of the analyzed objects.

In another preferred embodiment of the present invention, the system monitor the traffic in computer networks and possibly also via fax servers and fax machines, in order to identify and/or classify information objects and to assign or enforce a policy in accordance with the content of the information objects. The policy may contain restrictions on the usage, integrity and distribution of the information object.

Figure 6:
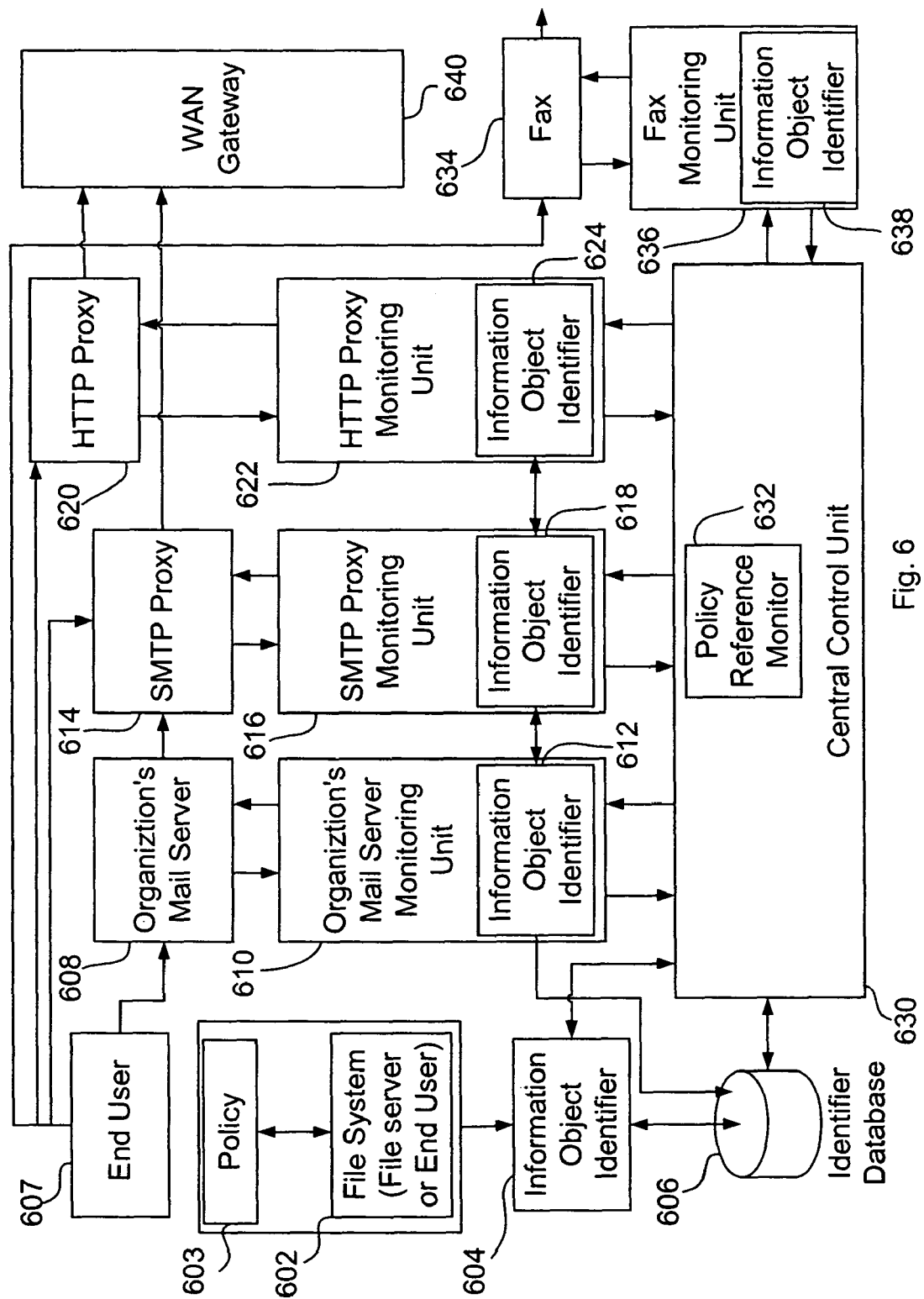
FIG. 6 is a simplified block diagram illustrating a basic network with monitoring units configured for basic network monitoring, constructed and operative according to preferred embodiment of the present invention.

Reference is now made to FIG. 6, which is a simplified block diagram illustrating a basic network and showing monitoring units distributed around the network, to allow for basic network monitoring according to preferred embodiment of the present invention. Digital content containing information objects resides on designated directories in a file system 602, and a policy 603 is assigned thereto as follows: a certain initial policy is assigned to each information object—either explicitly or implicitly, implicitly meaning a default policy. The file system 602 may resides on a dedicated server or on networked computers belonging to the network users. The information object identifier 604 may scans the directories and extract identifiers from the information objects in the various files. The identifiers are thereafter stored in the identifier database 606. When a user 607 subsequently attempts to disseminate digital content via the organizational mail server 608, organizational mail server monitoring unit 610 obtains the message and its attachments and utilizes information object identifier 612 in order to identify the information objects in the transport. The information object identifier 612 in turn utilizes the identifier database 606 in order to detect information objects to which a policy has previously been assigned. Results of the above-described detection process are sent to the policy reference monitor 632 of the central control unit 630. The policy reference monitor instructs the organizational mail-server monitoring unit 610 whether to allow transmission of the inspected mail, based on the results. Thus, for example, if the transport is being sent to an address outside the immediate organization, and an object is found within the transport having a policy indicating that it should not be distributed outside the organization, then the transport is stopped.

In a preferred embodiment of the present invention, as well as blocking the transport, or as an alternative thereto, the organizational mail-server monitoring unit 610 may, notify the user and/or the administrator about dissemination attempts that do not comply with the assigned policy and/or about suspected traffic. A substantially similar process may be applied to data dissemination via an SMTP proxy 614, HTTP proxy 620 and fax server 634. In these latter cases, the respective monitoring units: the SMTP proxy monitoring unit 616, the HTTP proxy monitoring unit 622 and the fax monitoring unit 636 obtain content information of the transport and utilize the respective information object identifiers 618, 624 and 638 in order to identify the information objects in the transport. Monitoring fax traffic can be performed, e.g., using the method described in U.S. provisional patent application 60/450,336 "A Method and System for Preventing Information Leakage via Fax Machines", filed Feb. 28, 2003, the contents of which are hereby incorporated by reference.

In a preferred embodiment of the present invention the central control unit 630 also plays a part in enforcement of policy, that is to say in transport blocking. In particular the central control unit controls traffic passing the WAN gateway 640 and can be used to prevent a particular transport from passing outwardly via gateway 640.

Figure 7:
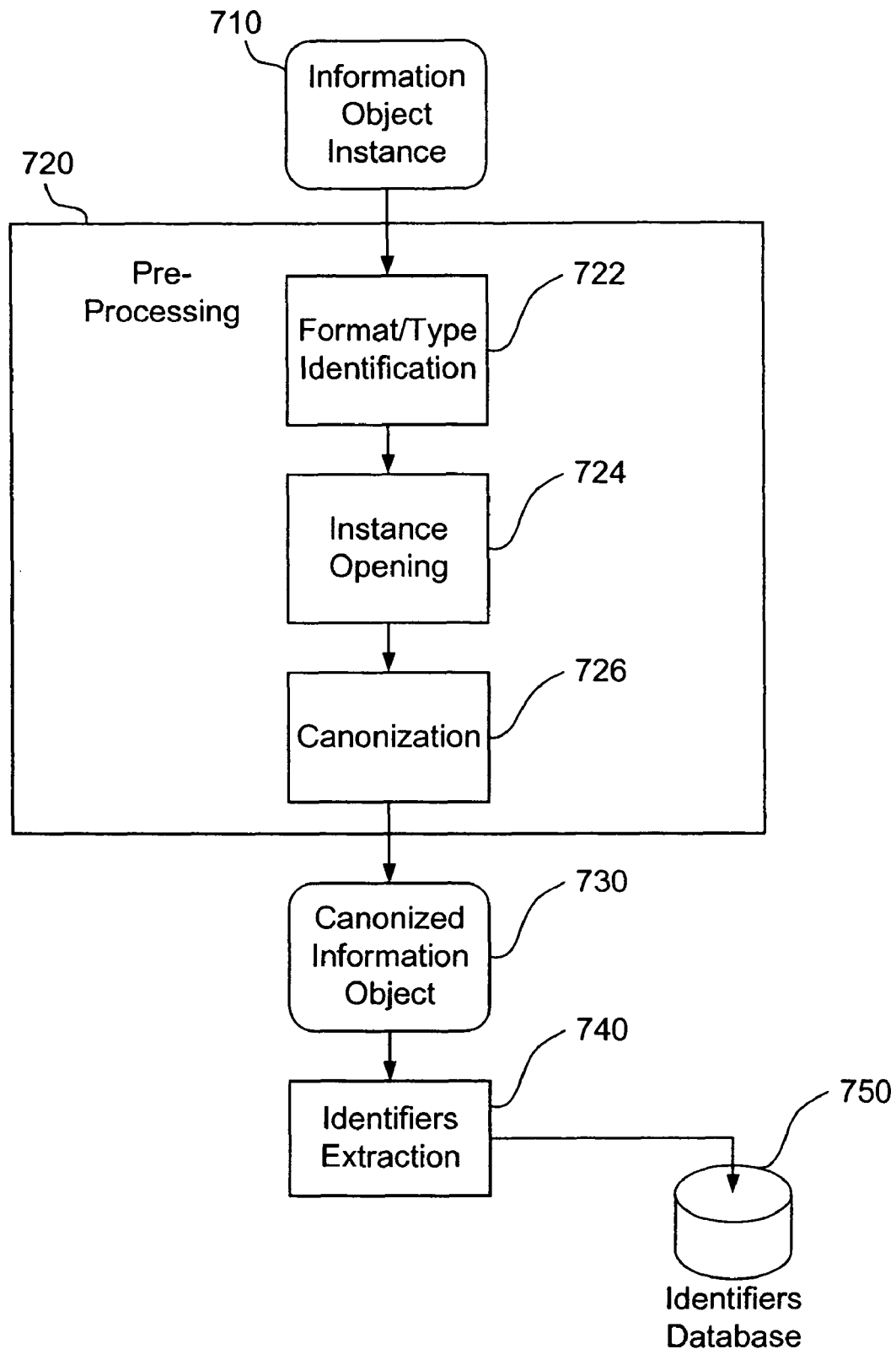
FIG. 7 is a simplified flow diagram illustrating a method for extraction of identifiers from an instance of an information object, constructed and operative according to a preferred embodiment of the present invention.

Reference is now made to FIG. 7, which is a chart illustrating a method for extraction of identifiers from an instance of an information object, constructed and operative according to a preferred embodiment of the present invention. The input to the method is an information object instance 710 such as a file that contain a MS-word document. The instance is subjected to a pre-processing stage 720, which includes identification of the format or type 722 (e.g., identification of the file format as a MS-Word file), instance opening 724 (e.g., file opening) and canonization 726. Canonization may for example comprise transforming the MS-Word file to plain Unicode text. The result is a canonized information object 730. From the canonized information object 730, one or more identifiers are then extracted 740 and are stored in an identifiers database 750, preferably together with the corresponding policy.

Figure 8:
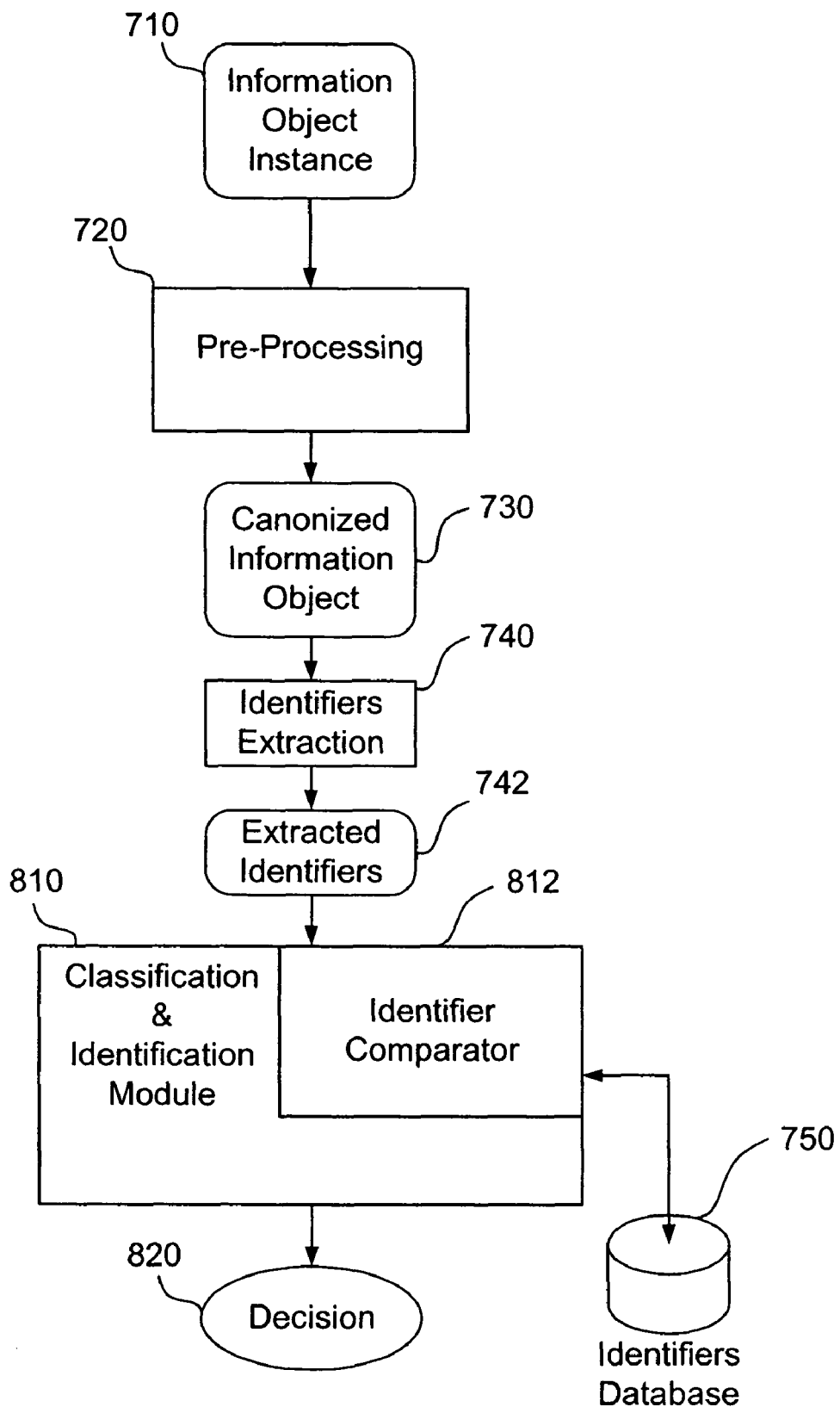
FIG. 8 is a simplified functional process diagram illustrating identification of an information object instance, operative according to a preferred embodiment of the present invention.

FIG. 8 illustrates a system and method for identification of an information object instance wherein after the identifiers of information objects are extracted and are stored in a database 750 together with their assigned policy—the system attempts to identify similar information objects within the digital traffic and/or within storage devices, in order to enforce the assigned policies: as in the method described is FIG. 7 the inspected information object instance 710 is subjected to pre-processing 720, a canonized information object 730 is formed and identifiers are extracted 740. The extracted identifiers 742 are used for classification and identification by a classification and identification module 810. The classification and identification module 810 utilizes an identifier comparator 812 in order to compare say, existing identifiers from identifiers database 750 with the extracted identifiers 742.

After evaluating the results a decision 820 regarding the identification of the information object is made. Based on this decision, a policy with respect to the inspected information object is enforced: e.g., if the decision is that the inspected information object 710 is substantially equivalent to another information object, to which its assigned policy limits its distribution to a certain users group in the organization, then attempts to disseminate information object outside the group should be blocked and reported. The notion of similarity may for example be based on the relative number of elementary information units that exists in both information objects, as explained above. The notion of "substantially equivalent" involve some subjective aspects, and it is therefore preferable that the threshold for similarity is tunable, so that a given organization can set the threshold after observing impacts of several threshold levels on "false positive" and "false negative" rates within its information traffic.

Figure 9:
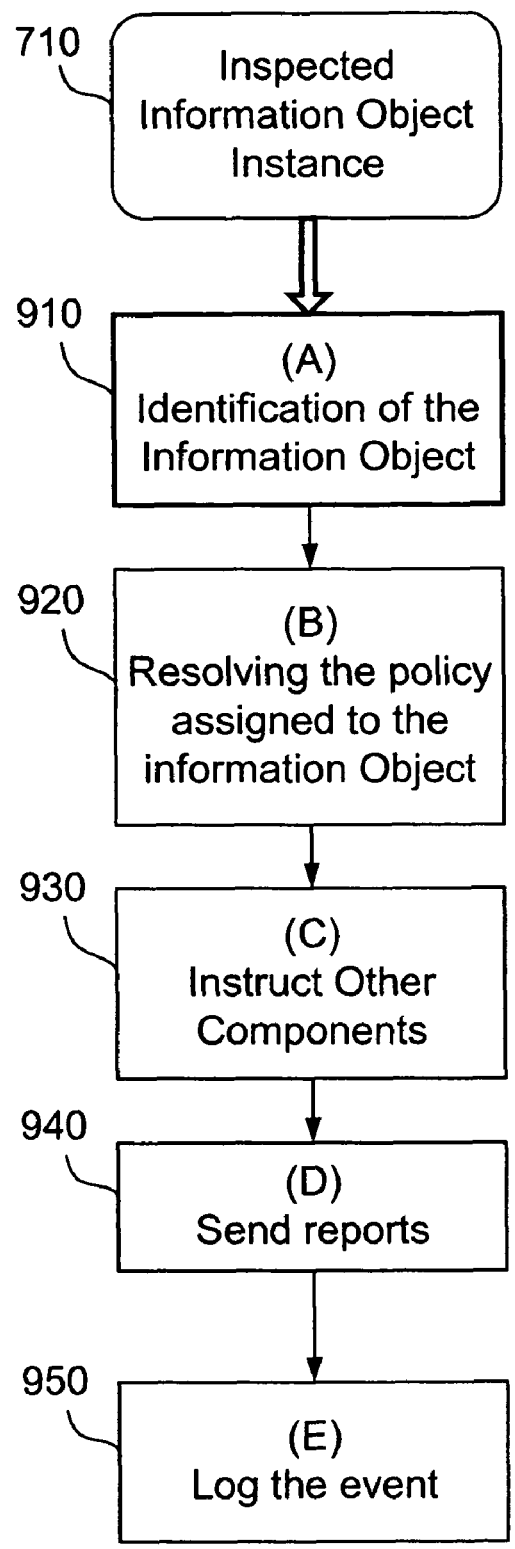
FIG. 9 is a simplified flow diagram which illustrates a method for policy enforcement with respect to information object instances, operative according to a preferred embodiment of the present invention.

Reference is now made to FIG. 9 which is a simplified flow diagram illustrating a method for policy enforcement with respect to information object instances, constructed and operative according to a preferred embodiment of the present invention. Parts that are the same as in previous figures are given the same reference numerals and are not referred to again except as necessary for understanding the present embodiment. The inspected information object instance 710 forms a first entity, and successful identification thereof is indicated by stage (A) 910. Subsequently, the policy assigned to the identified information object is resolved, as indicated by stage (B) 920. Subsequently, the relevant components in the system are instructed to enforce the policy thus identified, in a third stage (C), 930. For example, the SMTP server may be instructed to block the transmission of the information object instance. Subsequently, reports are sent to the relevant entities or persons, for example to the system administrator and the sender in a stage (D) 940, and finally the full details of the event, which may include sender and recipients identities, information object identifier, time and date etc. are logged in stage (E), indicated by reference numeral 950.

In a preferred embodiment of the present invention, frequent and/or non-salient items (common and frequent words carrying little content-specific information) are removed from the canonized information object before the extraction of identifiers, in order to promote the efficiency and the robustness of the identification process.

In a preferred embodiment of the present invention, the limitations on the usage of the information object comprise limitations to at least one of the following:

viewing the information object;
editing the information object;
transferring the information object;
storing the information object;
printing the information object;
changing the representation of the information object;
changing the properties of the information object;
changing the format of the information object;
copying portions of the information object;

In a preferred embodiment of the present invention, the limitation on the usage is application specific, i.e., the system allows usage of a specific information object only by one specific application or some specific applications.

In a preferred embodiment of the present invention, the limitation on the usage is operation-system specific, i.e., the system allows usage of a specific information object only by a specific operation system or operation systems.

In a preferred embodiment of the present invention, the limitation on the usage is user specific, i.e., the system allows usage of a specific information object only by a specific user or users.

In a preferred embodiment of the present invention, restrictions on editing, such as restrictions on copying, cut & paste, etc., may be imposed in document-specific manner, i.e., the system may allow editing of a certain document and yet prevent editing with others. Yet again it may prevent copying of information objects from one document to another, whilst permitting within the document itself.

In a preferred embodiment of the present invention, defined policies may include adding forensic information to an information object. This can be achieved by altering parts of the information object in a manner that is preferably substantially imperceptible, as described in PCT application number IL02/00464, filed Jun. 16, 2002 the contents of which are hereby incorporated by reference.

In a preferred embodiment of the present invention, the defined policy also includes replacing some of the content with other content in one or more of the copies of the original content. E.g.:

Classified paragraphs in a document can be replaced by unclassified paragraphs, or by null or contentless paragraphs, rendering the document unclassified.

Paragraphs may be added or removed according to the needs of the recipients, in order to construct a customized document.

In these cases, the system preferably utilizes a mechanism that enables maintaining the coherency of the text, taking into account linguistic considerations. In order to render the changes as seamless as possible, the system preferably also preserves the structure of the information object, the formatting style of the information object and the pagination style of the information object. In order to achieve that, the spaces between words and lines and the page margins can be manipulated by the system in a manner that is substantially unnoticeable.

In another preferred embodiment of the present invention, the information is inspected in one or several locations within a computer data network. Several kinds of traffic may be monitored, including instant messengers, mail, web, file transfer protocols, chat protocols (e.g. IRC) etc.

In a preferred embodiment of the present invention, monitoring is preformed using sniffing. In the sniffing embodiment, at least one listening node exists on the communication network and messages are analyzed on transit, in a manner analogous to wiretapping. Using sniffing, it can be that the information is already transferred when a breach of policy is detected. It is however possible to detect, monitor, log and alert regarding the illicit transfer, and it is often possible to stop it at midpoint, mitigating some of the damage. Implementing this method, different protocols need to be processed differently, utilizing e.g., the methods described in U.S. patent application Ser. No. 10/003,269 and PCT application number IL02/00037, the contents of which are hereby incorporated by reference, as the traffic may contain a mix of protocols.

In another preferred embodiment of the present invention, monitoring is performed using traffic forwarding. In traffic forwarding, a node through which the traffic passes monitors the traffic in a manner similar to sniffing as described above. However, the traffic is allowed to pass through the node only if and when the monitoring indicates that the traffic is authorized. Traffic may also be altered for example by deleting an attachment, removing sensitive information, adding a disclaimer, etc. Altering in this manner is advantageous in that it allows for a more versatile and robust policy enforcement. In traffic monitoring, as for sniffing, different protocols need to be processed differently, as described in U.S. patent application Ser. No. 10/003,269 and PCT application number IL02/00037, as the traffic may contain a mix of protocols. A router, gateway or firewall is usually used as the forwarding node.

In another preferred embodiment of the present invention, monitoring is performed utilizing a Proxy server. The proxy server method is similar to traffic forwarding, however, instead of monitoring all traffic, specific kinds of traffic are required to pass through a specialized proxy server. Preferably a firewall is used to block any and all attempts to bypass the proxy servers. Several established proxy protocols and technologies exists (e.g. HTTP proxying and SOCKS) which make it easier for these kinds of servers to interface outside systems. The SOCKS protocol is specifically designed for secure TCP proxying in a sensitive environment. Thus the proxy server method utilizes established support for these methods. The method has the ability to monitor, block, and alter traffic, and yet complexity is reduced since it selects the traffic it wishes to monitor.

The ability to alter traffic is useful in cases where it is needed to force a specific route for traffic (e.g. a proxy), or other behavior, and where uncontrollable software or a protocol takes a different route. In such a case it is possible to alter a field or fields in the controlling traffic, thus changing the behavior of the software. Such is often the case in instant messenger software, which generally attempts its own peer-to-peer connection. In a preferred embodiment of the present invention, the system analyzes the file transfer message sent by the instant messaging server, locates the address (e.g., IP address) and relays the transport on behalf of the participant that sends the file. Using this method, the system has access to the content of the relayed file, which allows the system to analyze the content and to apply the required policy.

In another preferred embodiment of the present invention, the system utilizes a method of detecting deliberate attempts to change the apparent content of the information, by creating identifiers that are invariant to at least some of the transformations in the information objects.

For example, consider a spreadsheet table with m rows and n columns. Denote by $X_{ij}$ the variables in the table; where i denote the index of the row and j denotes the index of the column, the identifier of the original file is comprised of the $3(m+n+1)$ numbers:

$$\langle X \rangle = \frac{1}{mn}\sum_{i=1}^{m}\sum_{j=1}^{n} X_{ij} \quad \langle X_i \rangle = \frac{1}{n}\sum_{j=1}^{n} X_{ij} \quad \langle X_j \rangle = \frac{1}{m}\sum_{i=1}^{m} X_{ij}$$

$$\langle X^2 \rangle = \frac{1}{mn}\sum_{i=1}^{m}\sum_{j=1}^{n} X_{ij}^2 \quad \langle X_i^2 \rangle = \frac{1}{n}\sum_{j=1}^{n} X_{ij}^2 \quad \langle X_j^2 \rangle = \frac{1}{m}\sum_{i=1}^{m} X_{ij}^2$$

$$\langle X^3 \rangle = \frac{1}{mn}\sum_{i=1}^{m}\sum_{j=1}^{n} X_{ij}^3 \quad \langle X_i^3 \rangle = \frac{1}{n}\sum_{j=1}^{n} X_{ij}^3 \quad \langle X_j^3 \rangle = \frac{1}{m}\sum_{i=1}^{m} X_{ij}^3$$

$$i = 1 \ldots m, \, j = 1 \ldots n$$

Denote by $Y_{ij}$ the variables in the examined table, with m' rows and n' columns, the identification signature of this table comprised of the 3(m'+n'+1) numbers:

$$\langle Y \rangle = \frac{1}{m'n'}\sum_{i=1}^{m'}\sum_{j=1}^{n'} Y_{ij} \quad \langle Y_i \rangle = \frac{1}{n'}\sum_{j=1}^{n'} Y_{ij} \quad \langle Y_j \rangle = \frac{1}{m'}\sum_{i=1}^{m'} Y_{ij}$$

$$\langle Y^2 \rangle = \frac{1}{m'n'}\sum_{i=1}^{m'}\sum_{j=1}^{n'} Y_{ij}^2 \quad \langle Y_i^2 \rangle = \frac{1}{n'}\sum_{j=1}^{n'} Y_{ij}^2 \quad \langle Y_j^2 \rangle = \frac{1}{m'}\sum_{i=1}^{m'} Y_{ij}^2$$

$$\langle Y^3 \rangle = \frac{1}{m'n'}\sum_{i=1}^{m'}\sum_{j=1}^{n'} Y_{ij}^3 \quad \langle Y_i^3 \rangle = \frac{1}{n'}\sum_{j=1}^{n'} Y_{ij}^3 \quad \langle Y_j^3 \rangle = \frac{1}{m'}\sum_{i=1}^{m'} Y_{ij}^3$$

$$i = 1 \ldots m', \, j = 1 \ldots n'$$

A comparison scheme is described, using the simple case in which m=m' and n=n', that is robust against permutations of the elements of the table and against linear transformation that is applied to all the elements. For example it may multiply all the elements by a constant, or may add a constant to all the elements, or both. The scheme is described by the following algorithm:
Algorithm:
Define tolerance variables $\epsilon_1$, $\epsilon_2$ and $\epsilon_3$
Assign: equal=0;
Evaluate:

$$\Delta_1 = |\langle X \rangle - \langle Y \rangle|$$

$$\Delta_2 = |\langle X^2 \rangle - \langle Y^2 \rangle|$$

$$\Delta_3 = |\langle X^3 \rangle - \langle Y^3 \rangle|$$

if $\Delta_1 \leq \epsilon_1$ and $\Delta_2 \leq \epsilon_2$ and $\Delta_3 \leq \epsilon_3$ Equal=1
Else //check for linear relation of the form y=ax+b
Evaluate:

$$a' = \sqrt{\frac{\langle Y^2 \rangle - \langle Y \rangle^2}{\langle X^2 \rangle - \langle X \rangle^2}}$$

$$b' = \langle Y \rangle - a'\langle X \rangle$$

$$\Delta' = \langle Y^3 \rangle - a'^3\langle X^3 \rangle - 3a'^2 b'\langle X^2 \rangle - 3a'b'^2\langle X \rangle - b'^3$$

if $\Delta' \leq \epsilon'$
equal=1
End
End
End

The above algorithm does not depend on the order of the elements in the table, and is robust to linear transformation that may occur, e.g., while transforming financial data from dollars to Euros.

In order to provide further robustness against cases in which only some of the rows or columns exists in the analyzed table, a similar comparison is also performed with respect to statistical moments of each row and column. The matches are counted and if the number of matched column or matched rows is greater then a certain threshold, an equal flag is set to "1". The threshold can be set according to specific needs which may stem from the sensitivity of the data and the tolerated level of false alarms.

In another preferred embodiment of the present invention, the system identifies graphical information objects, e.g., drawings, utilizing computerized image-matching techniques, described, in L. G. Brown: A survey of image registration techniques, ACM Computing Surveys, 24(4): 325-376, December 1992, the contents of which are hereby incorporated by reference.

In another preferred embodiment of the present invention, graphical information objects are identified by extracting key features of the objects, such as lines and their orientation, relationships between components, shapes, color and/or intensity distribution etc.

In another preferred embodiment of the present invention, pre-processing takes place on the images in order to facilitate the identification technique, such as canonizing the size and color, reducing noise, scene detection, canonizing size, canonizing orientation, canonizing color, removing color, reducing noise, enhancing area separation, enhancing borders, enhancing lines, sharpening, blurring etc.

In another preferred embodiment of the present invention, there exist several indices and/or identification systems, such that the resolution and accuracy of identification differ between the indices and/or identification systems. For example, one system may be very robust but provide a low resolution, another provide high resolution with lower reliability, and a third one provide high resolution, reliability, robustness and accuracy at the cost of high resource use.

The present embodiment may provide several advantages including the following:
  The ability to pinpoint a closely related segment, by using a very accurate index, but to achieve robustness and reliability with another index, and speed with yet another one. In most cases the same basic algorithm can be used, but with different parameters, options and thresholds. Several such options for selection of descriptors, preprocessing, and other such options are described below (e.g. descriptors resistant to manipulation and permutation). The ability to rely upon locality of similarity in order to increase reliability. Such ability can be achieved by increasing selection of required high thresholds for general similarity, but then calculating a new threshold based on the size of the portion of the document that contains the already found similarity. Now study of the localized similarity requires a lower threshold. A suitable threshold calculation may use a monotonically increasing function of a size, such that the percentage of similarity is lower for localized similarity. For example, a percentage based threshold function, based on the locality size (i.e., the size of the area in which similarity was found to be localized) in percentage, where for localized similarity over a given minimal percentage linearly increases up to a maximal percentage where there is no significant localization of similarity (i.e. the locality size is 100%).
  For example: X is the percentage of the similarity area out of the whole document (X=L/D where L is the size of the similarity area, and D is the size of the document), Y is the threshold in percentage terms of the document (Y=S/D where S is the similarity within L), so Y=max (0.2,X/2).

Increasing speed and accuracy of detection, by using a series of increasingly accurate indices on the suspect list as produced in the previous stage each time. Thus the suspect list shortens after each index. In another preferred embodiment of the present invention, the system contains a module operable to detect cases in which the information object has been subjected to manipulation in order to avoid its detection, classification or identification. Thus, for example, for a manipulation that comprises permutation of some of the words, one may use two type descriptors: one that is not sensitive to the order of the words, and one that is sensitive. The system can thereafter identify the content utilizing the type of descriptors that is not sensitive to the order of the words (e.g., histograms of the frequencies of the various words), and thereby determine to a certain level of probability the fact that the word has been subjected to permutations utilizing order-sensitive type descriptors. In cases where the manipulation comprises replacing characters with other characters, for example some kind of substitution or transposition cipher, the resulting content may include many words that are not real words, and are therefore not included in dictionaries. The analyzer can easily detect such a state, label the content as "suspected" and transfer the suspected content for a more thorough (possibly manual) analysis.

In a preferred embodiment of the present invention, the analyzer uses one or more of the following criteria for determining the plausibility that a certain document was subjected to manipulation in order to avoid detection:

Irregular word distribution patterns including the presence of unknown words, and disproportionate lack of common words.

Irregular distribution of characters.

Alphabetic characters mixed with non-alphabetic and numeric characters in words, thus Micro$oft, L00k, lamp, which are changes that might be believed to fool monitoring software.

Irregular distribution of word lengths, especially large proportions of long words, or all words being of uniform length.

Files which do not appear to be of the claimed format, thus appearing to be unopenable, for example a text file which starts with a zip header.

Encryption, or any other kind of encoding.

Incompatibility with expected punctuation and capitalization rules, such as apparently ending a paragraph in mid sentence.

Disproportionate number of spelling mistakes, especially in applications that allow spell-checking.

In another preferred embodiment of the present invention, the system contains a module operable to handle various documents that are derived from the same template (e.g., standard contacts). The template documents are stored in a special database as information objects. Each document that is derived from a template document is a compound information object, comprising the template information object and one or more additional information objects representing the added material or the differences from the basic template document. The template information object preferably contains the minimal number of elementary information units that are presented in all the documents that are derived from the said template.

In a preferred embodiment of the present invention, templates are considered as a special kind of Information object. The template information object comprises a sequence of information units, similarly to simple information objects, but the sequence also contains another kind of element, dubbed a placeholder. Placeholders may be generic, which is to say that they contain another sequence of information units, which may also contain embedded information objects, Alternatively the placeholders may be specialized. Thus in a form or like document a placeholder may contain a number, a name, or the like. Placeholders are useful for enhancing identification accuracy. Because the content of the placeholders is expected to change in different instances of the template, their content is not part of the template itself, thus, they provide clear internal boundaries for the template.

Some examples of document templates are standard disclaimers or headers, contracts, forms etc.

Templates can be filled with other information objects, a process defined as instantiation. Instantiation consists of replacing the placeholders with appropriate information objects. The result of this instantiation is another information object, which may have its own instances, i.e. appear in specific formats.

Templates can be defined in two ways: manual and automatic, as follows.

In manual definition, the templates are explicitly defined. By its very nature, manual definition specifies the exact intention of the person doing the definition, albeit at the price of requiring his or her time and attention. Manual definition is ideally the common method, and is especially useful for forms and standard contracts, but is also quite useful for disclaimers, headers, footers, etc. One of the main advantages of manual definition is the relative simplicity of providing explicit definitions for placeholders. That is to say the user actively defines the placeholders. It will be appreciated that placeholders are optional, meaning that templates are not required to have placeholders, but they are an integral part of the template definition when they are provided. Another advantage of manual definition is the perfect precision that is possible therewith. The person carrying out the definition can label or annotate the placeholder as desired, for example by identifying the type of information that is intended to be inserted at that point. In short, placeholders can readily be identified by the person doing the definition and can be explicitly defined, and an advantage of having placeholders is that they make it easier to identify passing information as being an instance of a given template and a difference or delta. The better defined the placeholders the easier it becomes to evaluate the deltas between the template and the instance. In the automatic mode, the system identifies substantially identical sections (identical information units) in different documents, by direct comparison or according to an index or other indirect method, and decides that they should be defined as template candidates. Manual intervention may be needed to approve, classify, or fine-tune the selection. Automatic template definition is obviously easier from the user perspective, and may often be more accurate, especially when access to the full text of both documents or versions is possible. In a preferred embodiment of the present invention, text matching and parsing is used in pinpointing the template.

The introduction of these templates is useful to prevent false identification of differently classified documents that contain them, or when the templates themselves have different classification.

In a preferred embodiment of the present invention, the system allows for declaring "ignored sections"—i.e., information objects and/or sets of elementary information units which the system can ignores while carrying out identification.

In another preferred embodiment of the present invention, the system allows automatic classification of information according to a current domain of knowledge or to organizational departments (e.g., "legal", or "medical") utilizing keywords and clustering methods specific to the domain. Knowing about the specific domain allows a more sophisticated policy assignment.

In a preferred embodiment of the present invention, the system allows for a default policy to be applied on information objects to which no previous policy has been defined. The policy is preferably also based on the domain of knowledge to which the said object belongs.

The various unique identifiers of the information units are preferably stored in a database. The order in which the identifiers are presented in the original information object can also be stored, in order to allow for a better detection.

In another preferred embodiment of the present invention, the policy can be defined in a manner that allows a given user to view only selected information objects that are parts of a current compound information object. Since policy can be assigned to each information object, and since the policy can specify who may view the particular information object, this feature can be readily implemented. In this case, the system preferably utilizes a mechanism that enables maintaining of the coherency of the text, taking into account linguistic considerations.

In another preferred embodiment of the present invention, the number of the identifiers of the elementary information units is reduced by performing random filtering, for example disregarding all the identifiers which end in "0", or other filtering methods, in order to reduce computational and memory resources. Reducing the number of identifier may reduce the redundancy level and the robustness level, and an optimal reduction should therefore be derived as a trade-off between the allocated resources and the required robustness level.

In another preferred embodiment of the present invention, identification may be based on a list of salient words and their respective distances, that are selected in a manner that assure that every portion of the text that is larger than a certain threshold (e.g., 10 words) contains at least one word from the list. The salient words are preferably not common and should convey distinctive power that enables identification of the information object.

In another aspect of the present invention, the system allows authorized persons to override automatic decisions of the system, in order to handle cases of miss-identification or exceptional cases, preferably using a specialized utility activated from the user interface. In a preferred embodiment of the present invention, the system policy determines the scope of the system decisions that can be overridden by the various authorized persons in the organization. In a preferred embodiment of the present invention, an override operation may require a high level of authentication on behalf of the authorized person.

In a preferred embodiment of the present invention, the system performs extensive logging of all the events and operations performed on selected information objects along the information lifecycle. The events and operations are preferably stored in a database, and in an embodiment the identifier of the information object is used as the main index. This allows a better understanding of the genealogy of the information object, and provides a useful tool for information management. One can understand the various phases in the development of the information object and gain an understanding of the entire process that produced the object, regardless of the various file formats and the software applications (e.g., word processors) used.

In a preferred embodiment of the present invention the system enforces a policy regarding information objects with respect to edit actions, such as copying and cut & paste, in a manner that allows performing of such actions only within a single document. In a preferred embodiment of the present invention this is achieved by monitoring the information held in the clipboard on an individual computer in order to identify information objects. Identification of the objects then leads to enforcement of the associated policy using a software client installed in the individual computer.

In a preferred embodiment of the present invention the system imports information regarding the organizational structure from organizational documents such as organization charts. The imported information is used in order to determine the default policy: e.g.:

Definition of departments.
Definition of working-groups.
Hierarchies: e.g., if user X reports to user Y, then user Y has (at least) all the authorizations of user X.

In a preferred embodiment of the present invention, a graphical user interface (GUI) is used in order to facilitate the transformation of organizational structure and other organizational data into a policy regarding confidential information management.

Figure 10:
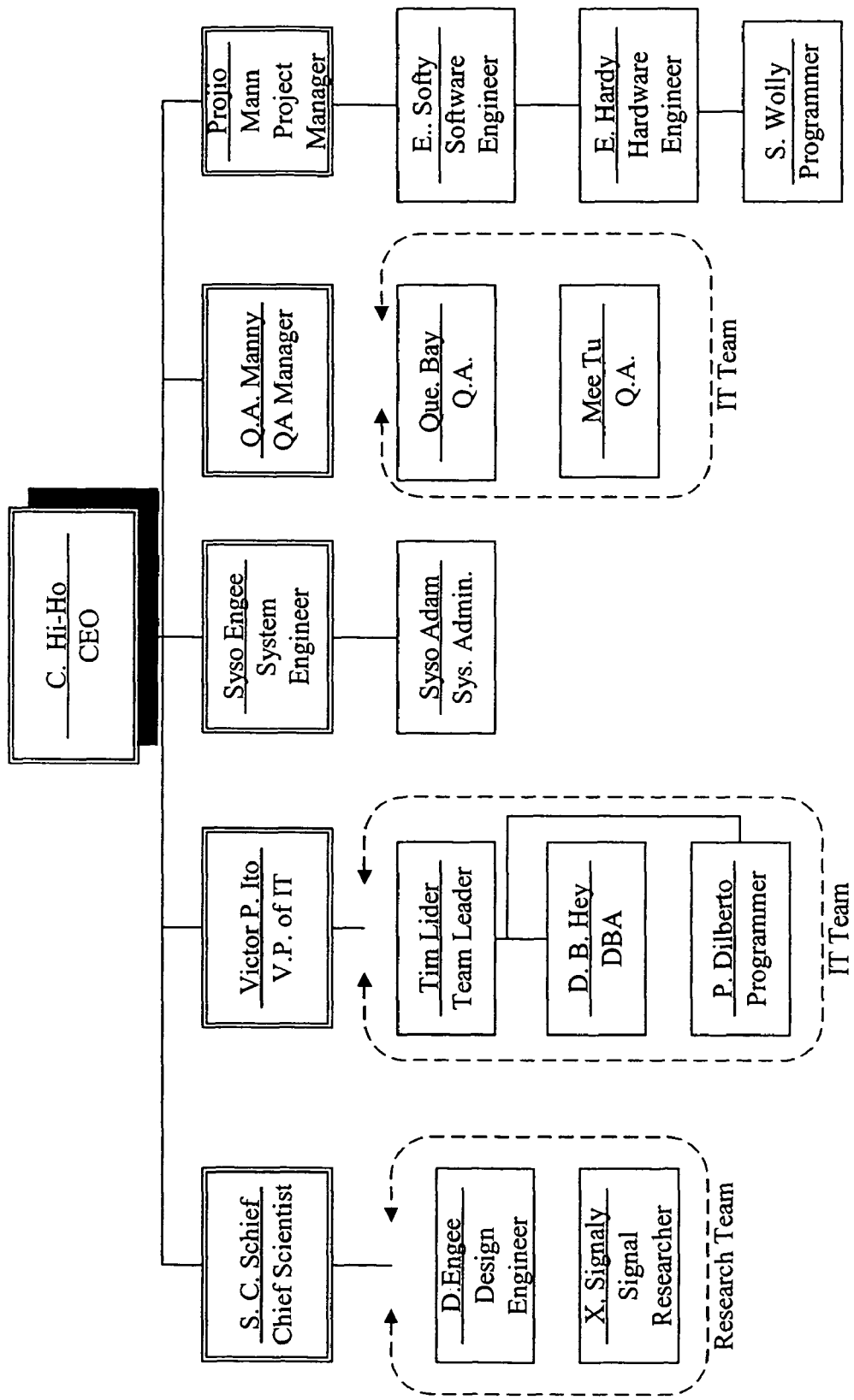
FIGS. 10A and 10B illustrate respectively an organizational structure and its transformation into a data structure, therefrom to define a default policy, in accordance with a preferred embodiment of the present invention.

Reference is now made to FIGS. 10a and 10b which are two diagrams that illustrate transformation of an organizational chart into a data-structure that allows a default policy to be defined. FIG. 10a illustrates a fictitious organizational chart, produced using "MS-Visio™" software, while FIG. 10b illustrates a data-structure in a MS-Excel format, derived automatically from the chart using the "MS-Visio™", software. From the data-structure a description of the members of the various departments and the organizational hierarchies can be derived, and the derivation can therefore support automatic definition of a default policy. A rule for defining a policy from such a data structure may be that if X reports to Y, then Y has at least all the permissions that X has, or that if both X and Z reports to Y, then X and Z are allow to freely communicate between themselves providing that they include ("CC") Y in their correspondence. Such rules can be added to the organizational policies and procedures, thereby facilitating the rapid formation of distribution policy.

Figure 11:
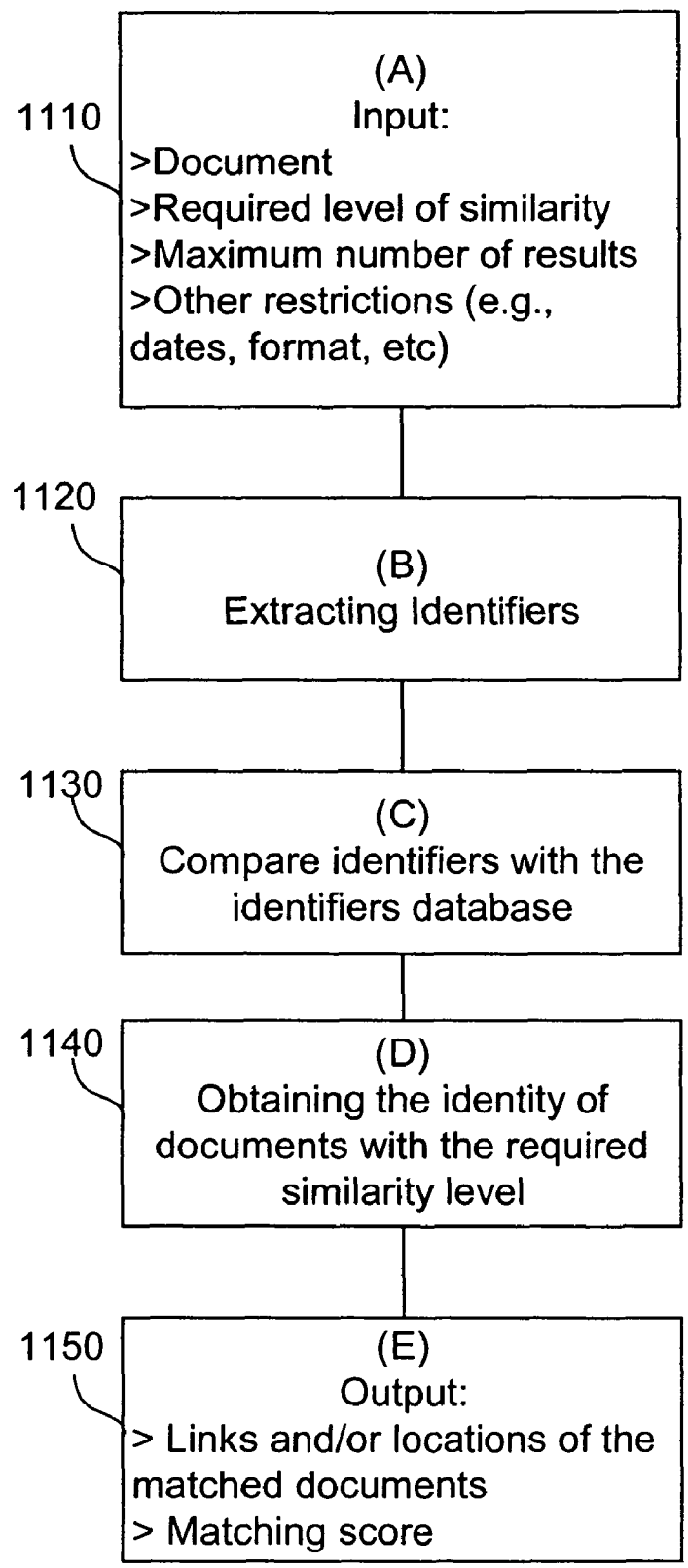
FIG. 11 is a simplified flowchart of a method that allows for document classification, according to a preferred embodiment of the present invention.

Reference is now made to FIG. 11, which is a simplified flowchart illustrating a method that allows for document classification, according to a preferred embodiment of the present invention. The inputs, at stage A, indicated by 1110, consist of the following data:

The document or the text itself
The required level of similarity. This level can be represented in terms of percentages (e.g., "80%") or a more qualitative terms ("high", "medium" and "low")
Maximum number of results
Other restrictions (e.g., creation and updating dates, formats, "containing specified text" etc.)

The system thereafter extracts characteristics identified from the document, as explained above, in stage B 1120. In a preferred embodiment of the present invention, the characteristics are the numerical identifiers of the elementary information units, as explained above. The system then compares the characteristics with the identifiers database in stage C 1130, and then obtains the identities of documents with the required similarity level of their characteristics. In a preferred embodiment of the present invention, the similarity measure between document A and document B is based on the parts that are common between the two objects. For example, if document A is described by 400 elementary information units, and document B is described by 500 elementary information units, out of which 300 elementary information units are common to A and B, then the similarity between A and B is 300/400=0.75, and the similarity between B and A is 300/500=0.6. The ID may for example be a system ID number of the respective document. The Ids of documents having similar characteristics are obtained in stage 1140. The output, produced in stage E, indicated by 1150, consists of links and/or locations or paths to the matched documents, including the filename and preferably also a score indicating the level of matching.

Figure 12:
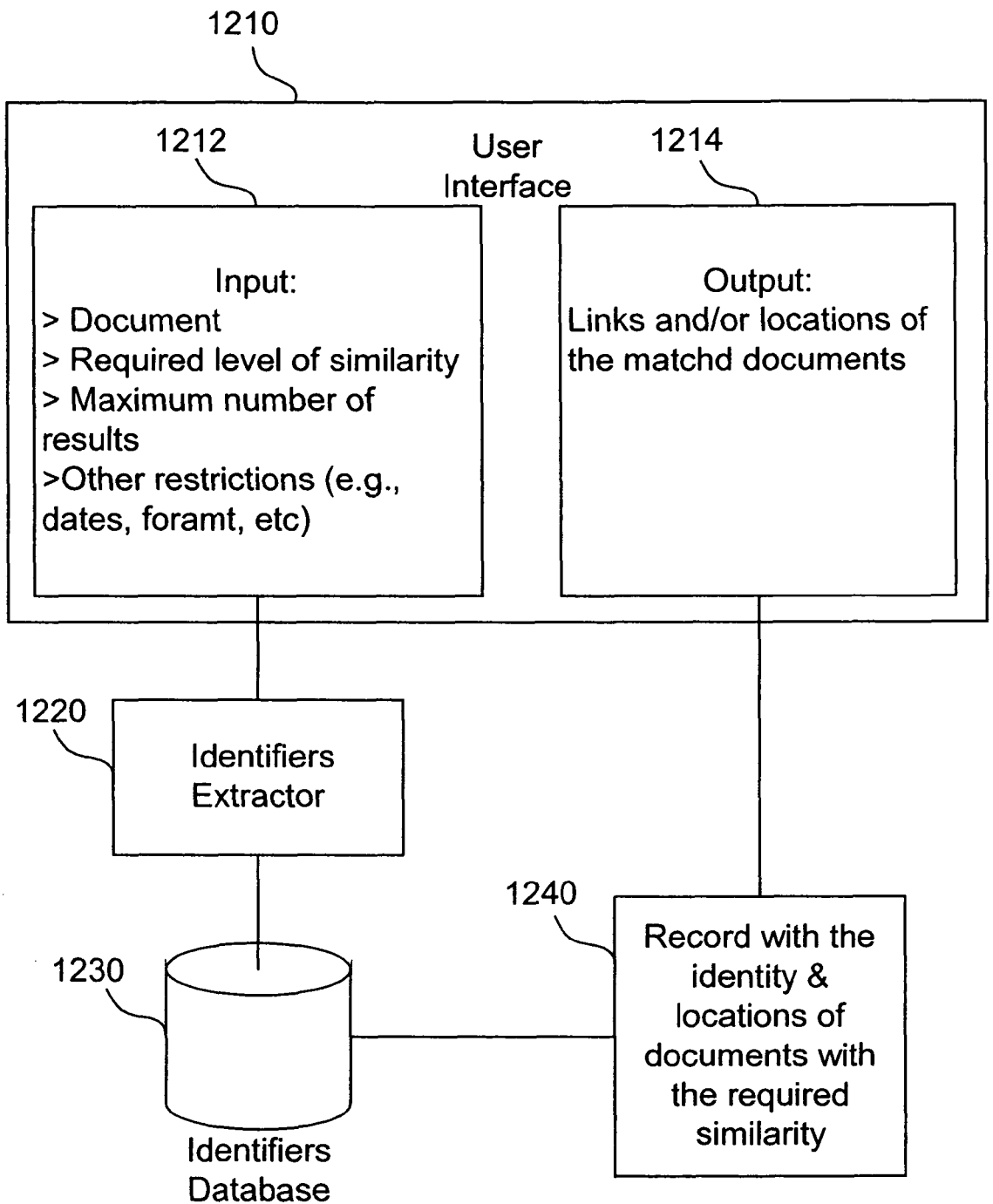
FIG. 12 is a simplified block diagram illustrating a system that allows for document classification, according to a preferred embodiment of the present invention.

Reference is now made to FIG. 12, which is a simplified diagram that illustrates a system for document classification, according to preferred embodiment of the present invention. A user operates a user interface 1210 to provide relevant inputs 1212. These inputs may include:

The document or the text itself

The required level of similarity. This level can be represented in terms of percentages (e.g., "80%") or a more qualitative terms ("high", "medium" and "low")

Maximum number of results

Other restrictions (e.g., creation and updating dates, formats, "containing specified text" etc.)

The characteristics identified are extracted from the document by the identifiers extractor 1220, as explained above. The identifiers are then compared with the identifiers in the identifiers database 1230, resulting in a record 1240, that contain the identities and locations of the documents with the required similarity. The links and/or locations of the documents with the required similarity, preferably with the matching score, are then presented to the user 1214, within the user interface 1210.

Figure 13:
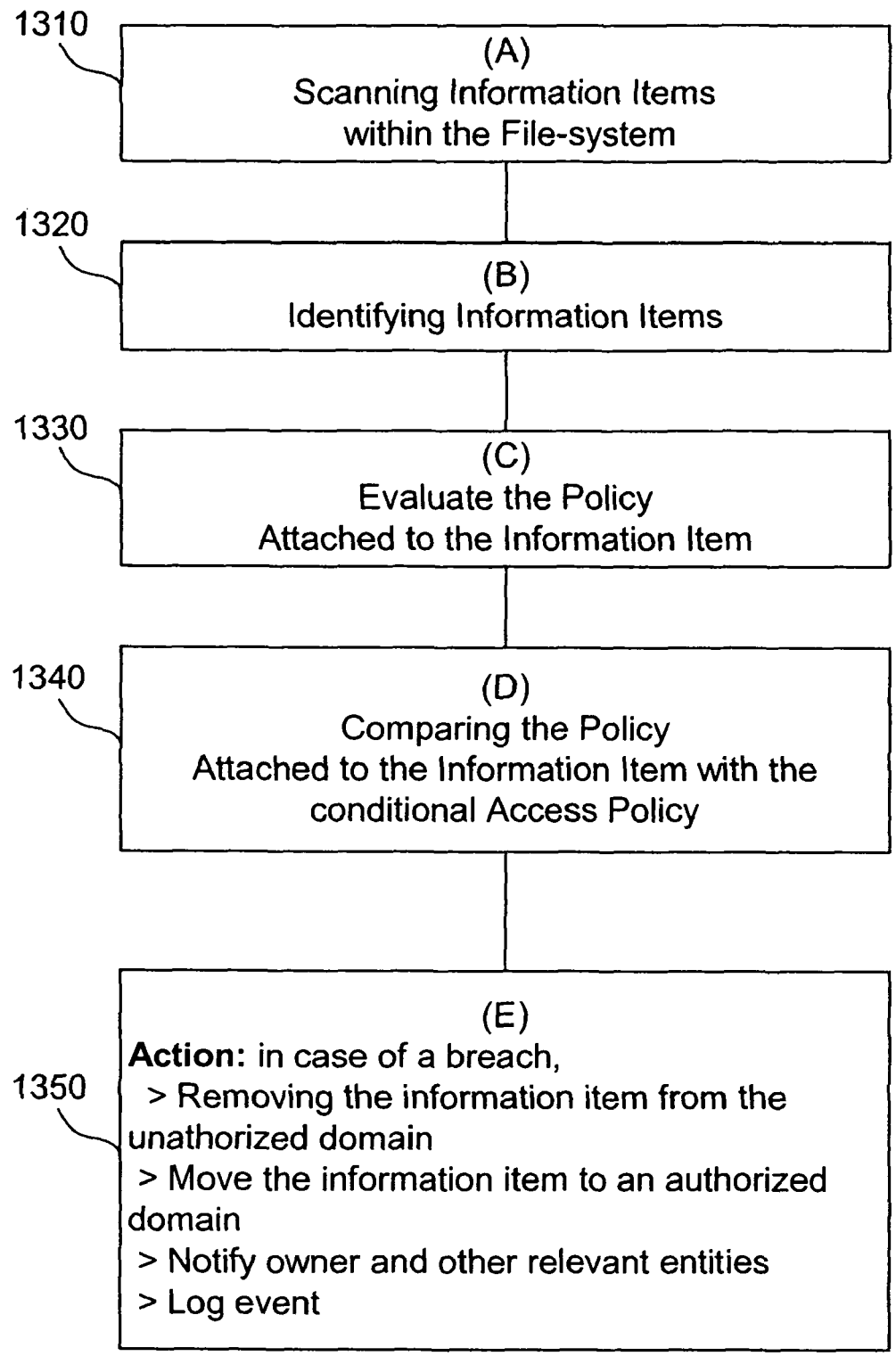
FIG. 13 is a simplified flowchart illustrating a method for augmenting a conditional access system by providing information-based clearance, according to a preferred embodiment of the present invention.

Reference is now made to FIG. 13, which is a simplified flowchart of a method for augmenting conditional access system by providing information-based clearance, according to a preferred embodiment of the present invention. The system scans the file system for identifiable information items in stage A, indicated by 1310. The system thereafter attempts to identify information items in stage B, indicated by 1320 and evaluate the policy attached to the identified information items in stage C 1330. The policy attached to the information items is then compared with the conditional access policy, stage D 1340. For example a certain user is authorized to view a certain file, but the file may contain an information item that the user is not authorized to read. Thus there is a breach in the information usage policy. In such a case, action may be taken, stage E, indicated by 1350—e.g., removing the restricted information item from the unauthorized domain, moving restricted information item to an authorized domain, notifying the owner and other relevant entities, logging the event, etc.

Figure 14:
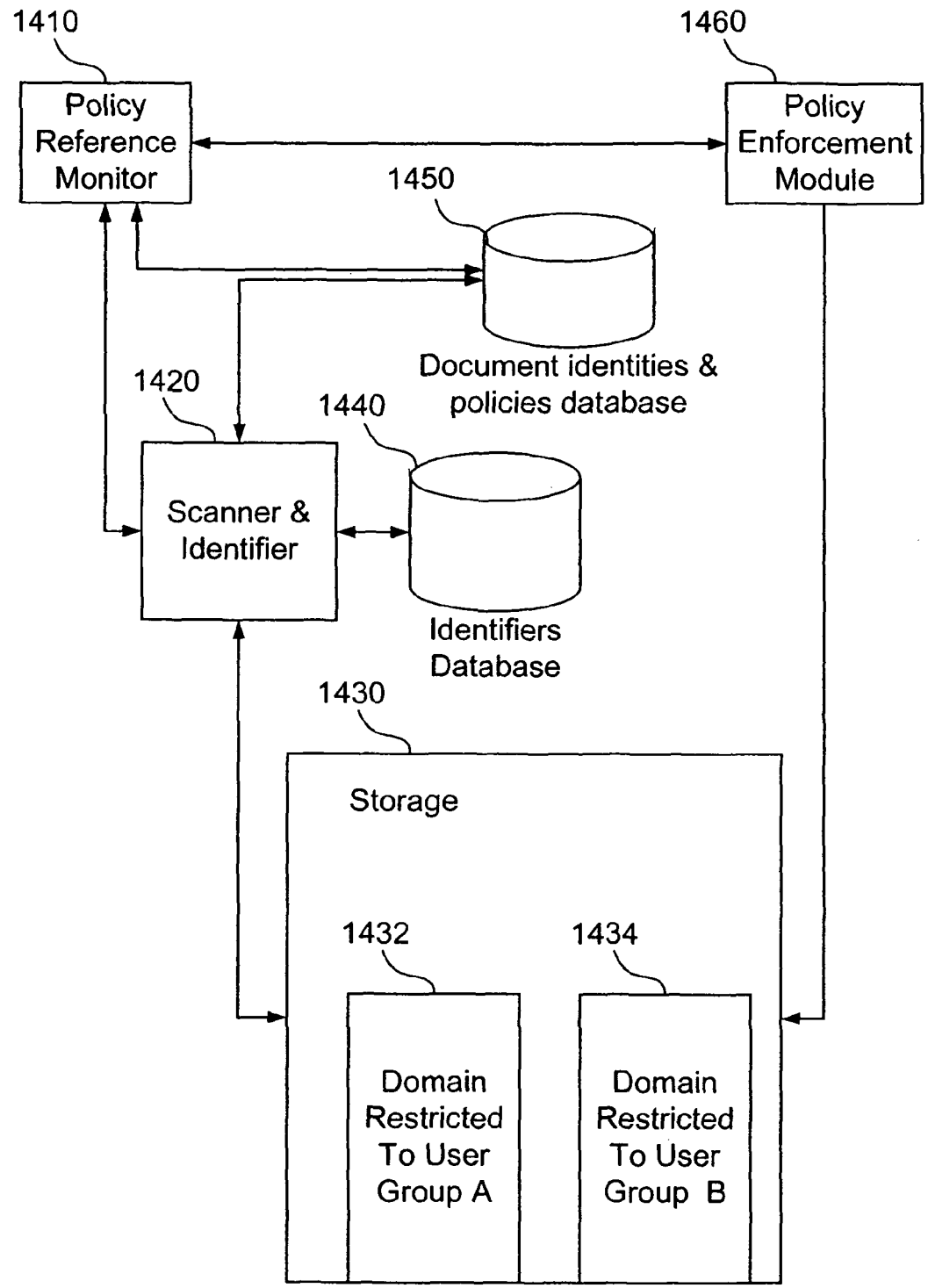
FIG. 14 is a simplified block diagram illustrating a system for augmenting conditional access by providing information-based clearance, according to a preferred embodiment of the present invention.

Reference is now made to FIG. 14, which is a simplified diagram that illustrates a system for augmenting conditional access by providing information-based clearance, according to a preferred embodiment of the present invention. Policy reference monitor 1410 instructs scanning and identifying module 1420 to scan the storage 1430 (e.g., a file system). In a preferred embodiment of the present invention, the scanning and identifying module contain is a file-system crawler. The storage may, for example, contain a domain 1432 that is restricted to user group A and a domain 1434 that is restricted to user group B. The scanning and identifying module 1420 uses the identifier database 1440 in order to determine the identity of the analyzed information items. The identities of the analyzed information items, together with their respective policies, are stored in the document identities and policies database 1450. The resolved identity is then sent to the policy reference monitor 1410, which utilizes the document identities and policies database 1450 in order to resolve the corresponding policy. The policy reference monitor 1410 then instructs the policy enforcement module 1460 to apply the appropriate action, according to the resolved policy, on the file system 1430.

Figure 15:
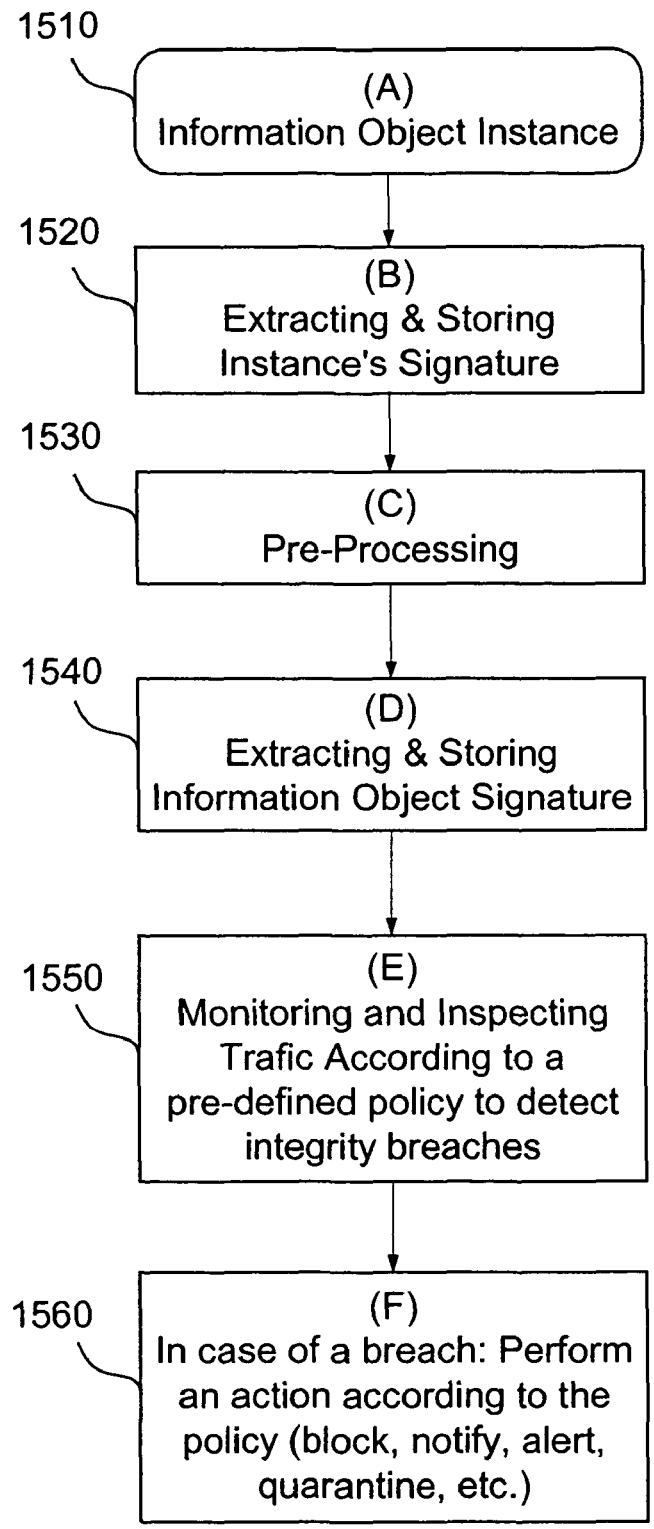
FIG. 15 is a simplified flowchart of a method for determining the integrity of an information object.

FIG. 15 is a flowchart of a method for determining the integrity of an information object, according to a preferred embodiment of the present invention. The system obtains as an input an information object instance in stage A, 1510, and extracts and stores an electronic signature of the instance in stage B, 1520. The signature is evaluated such that any change in the instance completely destroys the signature, so for example in a case in which the instance is a file, the signature can be a cryptographic hash of a binary representation of the file. The instance is then subjected to a pre-processing stage C, 1530, in order to reveal its information content. The system then extracts and stores the information object signature in stage D, 1540, and monitors and inspects the digital traffic according to a pre-defined policy in order to detect integrity breaches in stage E, 1550. In the case of a breach, the system performs the action determined by the pre-defined policy—for example it blocks the transport, notifies the owner, alerts the administrator, places the message in quarantine etc in a stage E, 1550.

Figure 16:
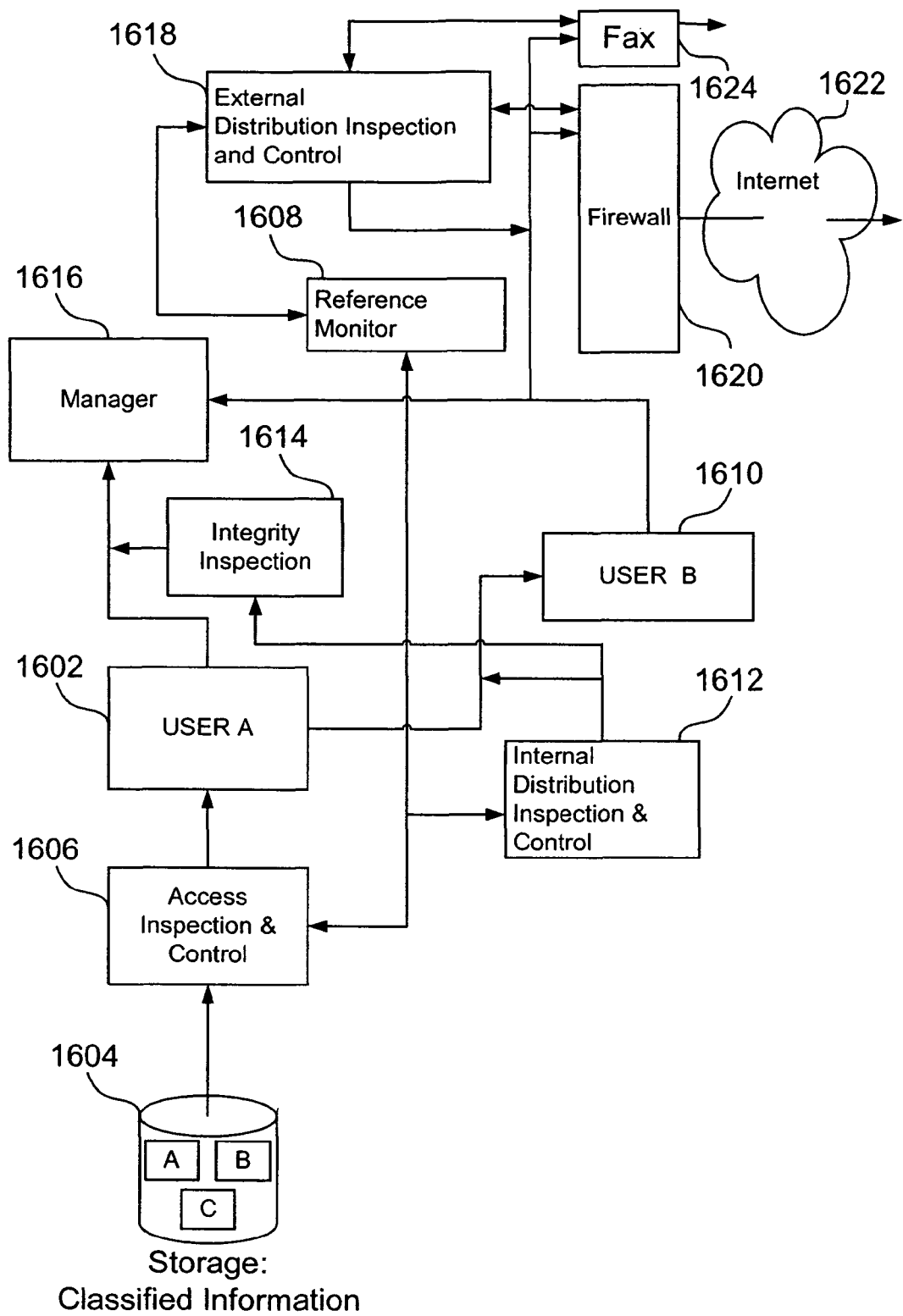
FIG. 16 is a simplified block diagram illustrating a system for ensuring data integrity according to a preferred embodiment of the present invention.

FIG. 16 illustrates a system for assuring the integrity of an information object, according to a preferred embodiment of the present invention. When a user A 1602 access an information item in classified information storage 1604, the access inspection and control module 1606 extract the integrity signature of the information item and send it to the reference monitor 1608. When User A 1602 attempts to send the information item to user B 1610 or to the manager 1616, the internal distribution inspection and control module 1612 and the integrity inspection module 1614 between them verify the integrity of the information item, and according to the policy dictated by the policy reference monitor 1608 determine whether to allow or to block the information transaction. Similarity, when either user B 1610 or the manager 1616 attempt to send the information item externally via firewall 1620 to the internet 1622 or via fax 1624, the external distribution inspection and control module 1618 verifies the integrity of the information item and according to the policy dictated by the policy reference monitor 1608 determines whether to allow or to block the information transaction.

In a preferred embodiment of the present invention, the system interfaces with the organizational document management system. Document management systems are useful tools for managing confidential information, however, these systems manage files that are generally in a proprietary file format and enforce a policy only with respect to such pre-defined file formats. In a preferred embodiment of the present invention, the system obtains the definition of the policy from the document management system and supplements the document management system by enforcing policy with respect to information objects rather then files. In this case, the system extracts identifiers from the documents in the files and identifies and transfers corresponding policies from the document management system. The system then enforces the distribution policy defined by the document management system with respect to information object, regardless of their format. In another aspect of the present invention, the system scans for pre-designated information objects in storage devices, such as the user's hard disks, in order to locate unauthorized content stored by a user, utilizing client-side software. Preferably tamper resistant client-side software is used for that purpose.

In a preferred embodiment of the present invention, the system utilizes client-side software in order to enforce a policy on the users. In a preferred embodiment of the present invention, the client is a tamper-resistant client, which uses a secure connection to a centralized database in which descriptors of information-objects, together with the corresponding policies, are stored. Methods for constructing such a tamper-resistant client are described, e.g., in U.S. patent application Ser. No. 10/051,012, "A Method and a System for Securing Digital Video", filed Jan. 22, 2002, and in U.S. provisional patent application 60/437,031, "A method and system for protecting confidential information", filed Dec. 31, 2002, the contents of which are hereby incorporated by reference.

The client preferably monitors policy-regulated activities such as editing, storing, particularly storing on potentially mobile devices, sending, copying segments or printing. The client reports its findings and may prevent actions not allowed by the policy. The client may also monitor and report attempts to circumvent the system's protection.

In a preferred embodiment of the present invention, the correspondence between information objects and policies and/or rules is induced by defining the policy and/or the rule as a property of information object.

During the process of knowledge acquisition, some elementary information units are accumulated and clustered, while other elementary information units are subtracted. In order to be able to trace the information, a tracking channel is assigned to any information object. The tracking channel utilizes the notions of similarity (described above) and continuity in order to trace information evolution along the information lifecycle. The tracking channel can utilize any of many known methods, for example those taught in D. Hall, "Lectures in Multisensor Data Fusion and Target Tracking", Artech House; ISBN: 1580531407; Cd-Rom edition (March 2001), the contents of which are hereby incorporated by reference.

In a preferred embodiment of the present invention, the default policy and other aspects of tracking, usage monitoring and policy enforcement are created and implemented taking into account at least one of the following criteria:

Information properties of the information object, for example language, representation, etc.
The operations carried out on the information object
The various users along the information life cycle.
The software applications used with respect to the information object.
The transmission channel.
The participant agents.
The virtual, logical and physical location of the computers.
Computer types (lap-top, desk-top, server, etc)

In a preferred embodiment of the present invention, the system allows defining and enforcing of a policy that prevents sending or copying of specific information objects to a laptop computer and/or portable media.

In a preferred embodiment of the present invention, the system allows defining and enforcing of a policy that prevents sending or copying of specific information objects from a computerized device that is not located within the perimeter that is subject to monitoring and inspection. In a preferred embodiment of the present invention, this is done via a software client that resides on the computer and monitors information usage, as explained, e.g., in U.S. provisional patent application 60/437,031 the contents of which are hereby incorporated by reference.

In a preferred embodiment of the present invention, the system allows defining of a policy that prevents sending or copying of specific information objects unless they are encrypted to the system's satisfaction.

In a preferred embodiment of the present invention, the system automatically encrypts specific information objects using a default key, as part of a default policy, and sends the encrypted content to the recipients. In a preferred embodiment of the present invention, the system disseminates specific information objects, as part of a default policy, using a secure channel such as TLS (Transport Level Security).

In another aspect of the present embodiments, the system creates information about the relationships between different information collections rather than information about the information collected within the information collections, thus revealing information not contained in any of these collections. The relationship information may include history and workflow information, template related information and other information, and is sometimes referred to as meta information.

This creation of information can be facilitated by comparing different documents, locating similarities and differences, this, especially combined with external information (such as file creation, modification and access date, relevant users, meta data contained in the files or in a file management system etc.), can be used to discern the workflow related to these documents, their relationship to each other (e.g. document B is based on documents A and C) and be used for reporting or other purposes. This kind of information is useful for document management, especially when combined with a document management system, for archival purposes, and for reference purposes. When document access and use is regulated by a policy, this information is useful for policy enforcement and definition.

In another aspect of the present invention a method and system for knowledge management and control are presented, based on modular and abstract descriptions of knowledge. In this case, the elementary units are denoted as facts. As a first step in practicing the invention, elementary facts (EF) are defined. These elementary facts may be represented as sentences (e.g., "Mr. John Doe earn 65000$ in 2001"), as entries to a database etc. The system then assigns representation-independent identifiers and indices for each elementary fact. Knowledge objects, consist of one or more facts are thereafter defined by the system. For example, a set of facts about Mr. John Doe can be considered as a knowledge object. Within the context of this aspect of the present invention, a knowledge object is the basic ingredient on which a knowledge-oriented policy is defined. A simple knowledge object is a knowledge object that can be fully described as a set of elementary facts, while a compound knowledge object is a knowledge object that consists of two or more simple knowledge objects. A knowledge class is the set of all knowledge objects on which precisely the same policy is defined. An instance of a knowledge object is a specific representation of the knowledge object, e.g., a file of a database in a MS-Access™ format. Utilizing this terminology and nomenclature, a system substantially similar to the one described above can be used in order to provide confidential knowledge management.

The information assets within an organization (e.g., financial information used for balance sheets) tend to evolve along a path, and undergo various stages of processing, validation, reviewing and assurance until the final product is produced. Maintaining the Confidentiality, Integrity & Availability (CIA) of the information along the process poses a non-trivial problem for most organizations.

In order to solve these problems, the organizations may consistently attempt to maintain an Intact Information Path, based on the following methodological steps:

Risk assessment: at a given stage, various potentially dangerous scenarios should be considered and their impact should be analyzed. The impact analysis should take into consideration both aspects of legislation and liability and direct and indirect damage to the organization from breach of the confidentiality, integrity and availability of the information.

Defining a well-formed information path for various types of information. Such a path requires all of the organizational information to be classified, and that for any type or class of information, information regarding ownership and path are carefully planned, defined and tested according to specific needs. The definition of the information path may include:

Ownership: Selection and appointment of information owners and ownership hierarchy according to the owners' role in the organization.

Storage and Availability: Definition of authorized storage devices and methods and their security policy and availability level.

Access Policy & Control: definition of the access privileges of the various entities and the required identification, authentication and authorizations. This well known practice should be carefully employed in order to assure compliance with organizational needs and to verify that the access policy is enforced with respect to the information assets, regardless of their representations, instantiations and formats.

Usage and Processing: various entities that participate in the information path should be entitled, or required, to perform certain tasks, such as information possessing and filtering, integrity validation and assurance, final approval etc.

Distribution Policy: the distribution policy includes statements and rules regarding the authorized communication channels, authorized senders and recipients, the authorized formats, the required recipients, and any other restrictions and constrains with respect to any information item.

Audit and Detection: There is preferably provided an audit program that covers all of the aspects of information access, usage, manipulation and transition. The system preferably detect and records all the relevant parameters in order to provide a comprehensive audit and allows the reconstruction of the chain of events when needed. Detection rules for irregularities may be designed together with actions to take on events.

Retention Policy: In order to limit the risk of information leakage while maintaining important information assets, a proper information retention policy may be defined. The retention policy may specify the minimal and/or the maximal time for which the information should be kept, the level of confidentiality that should be maintained during the various stages of the information lifecycle and possibly also the timeline for information disclosure. It is important that the retention policy is defined with respect to the information asset regardless of its instantiation: in many cases, after a specific file or document was deleted, other instances of the information item exists—e.g., under a different filename and/or in a different file format, thereby exposing the organization to un-necessary legal liabilities and perils of unwelcome information disclosure.

Maintaining the Intact Information Path: in order to prevent fraud the information flow within an organization should be continuously monitored and inspected, so that no covert channels are available and that the integrity and the accuracy of disseminated or disclosed information can be confirmed. Therefore, after the information path is defined, it should be constantly inspected and monitored in order to assure that:
  1. No unauthorized party is added to the path.
  2. No entity that should be in the path is bypassed
  3. The integrity of information is preserved along the path: information items are changed, manipulated, added or deleted only by authorized entities and in an authorized manner.

In order to achieve the above goals, the information path may contain inspection & control points, in which the distribution policy is enforced and the integrity of the information is verified.

In a preferred embodiment of the present invention the policy further includes a mandatory lifecycle. A mandatory lifecycle is a process that must be undergone in certain circumstances, e.g. when a certain user sends a certain type of information to a certain recipient, another predefined recipient (usually a supervisor or auditor) must also be a recipient (usually in order to prevent fraud, and to facilitate auditing). Another example is a certain order of events that must be enforced (e.g. the information can only be sent out after it was received by the legal department and after the legal department has submitted an approved copy, then the system ensures that only the approved copy can be sent out). The present embodiment thus address the shortcomings of the presently known configurations by providing a method and system for robust tracking and management of information and knowledge, which can efficiently serve digital information management, audit and control.

It is appreciated that one or more steps of any of the methods described herein may be implemented in a different order than that shown, while not departing from the spirit and scope of the invention.

While the present invention may or may not have been described with reference to specific hardware or software, the present invention has been described in a manner sufficient to enable persons having ordinary skill in the art to readily adapt commercially available hardware and software as may be needed to reduce any of the embodiments of the present invention to practice without undue experimentation and using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent, or patent application was specifically and individually indicated to be incorporated herein by reference. In addition, citation or identification of any reference in this application shall not be construed as an admission that such reference is available as prior art to the present invention.

REFERENCES

The following documents, some of which are referred to above and some which are not, are hereby incorporated herein by reference.

[1] U. Manber: Introduction To Algorithms: a Creative Approach, pp 155-158, Addison-Wesley publishing company, 1989, ISBN 0-201-12037-2

[2] R. O. Duda, P. E. Hart and D. G. Stork: Pattern Classification (2nd Edition), John Wiley & Sons, Inc. 2001. ISBN 0-471-05669-3

[3] U.S. patent application Ser. No. 10/003,269: "A System and a Method for Monitoring Unauthorized Transport of Digital Content", filled Dec. 6, 2001

[4] L. G. Brown: A survey of image registration techniques. ACM Computing Surveys, 24(4):325-376, December 1992.

[5] N. Linial, Y. Rabinovich: The Geometry of Graphs and Some of its Algorithmic Applications. *Combinatorica* 15(2): 215-245, 1995.

[6] PCT application number IL02/00464, "A method and system for embedding textual forensic-information", filed Jun. 16, 2002.

[7] D. Hall, "Lectures in Multisensor Data Fusion and Target Tracking", Artech House; ISBN: 1580531407; Cd-Rom edition (March 2001)

[8] U.S. provisional patent application No. 60/437,031: "A Method And System For Protecting Confidential Information", filed Dec. 31, 2002.

[9] U.S. provisional patent application No. 60/450,336, "A Method and System for Preventing Information Leakage via Fax Machines", filed Feb. 28, 2003.

The invention claimed is:

1. A method of controlling usage of information subject to evolution, usage of the information being in information objects, the information objects respectively comprising a plurality of basic information units wherein some of said basic information units change with said evolution and some of said basic information units comprising elementary information units that remain constant with said evolution, the method being carried out on an electronic processor, the method comprising:
   prior to said evolution, identifying ones of said information objects to which it is desired to apply a usage policy;
   monitoring said information objects during said usage and said evolution;
   comparing basic information units of said monitored information objects with basic information units of ones of said identified information objects, to determine a quantity of said elementary information units that are identical in both; and
   if said quantity exceeds a predetermined threshold for a given one of said identified information objects then applying a respective usage policy associated with said given identified information object to said monitored information object, thereby managing said information objects in the face of evolution of information therein.

2. A method according to claim 1, wherein said information objects comprise at least one simple information object, said simple information object comprising one of the following:
   an elementary information unit;
   a set of elementary information units; and
   an ordered set of elementary information units.

3. A method according to claim 2, wherein said information objects comprise at least one compound information object, said compound information object comprising at least one of the following:
   a simple information object; a compound information object; an ordered set of compound information objects; an ordered set of simple information objects; and an ordered set of compound and simple information objects.

4. A method according to claim 1, wherein said elementary information units comprise at least one of the following:
   a sentence; a sequences of words; a word; a sequence of characters; a character; a sequence of numbers; a number; a sequence of digits; a digit; a vector; a curve; a pixel; a block of pixels; an audio frame; a musical note; a musical bar; a visual object; a sequence of video frames; a sequence of musical notes; a sequence of musical bars; and a video frame.

5. A method according to claim 2, further comprising assigning elementary information units identifiers to elementary information units after identification.

6. A method according to claim 2, wherein said elementary information unit identifiers are utilized in said identifying.

7. A method according to claim 5, wherein said elementary information unit identifiers are determined by the content of said elementary information units which they are assigned to.

8. A method according to claim 7, wherein said elementary information unit identifiers are solely determined by said content.

9. A method according to claim 5, wherein said elementary information units identifiers are at least partly determined by locations within an information object of respective elementary information units to which they are assigned.

10. A method according to claim 5, wherein said elementary information units identifiers are at least partly determined by the content of an elementary information unit in proximity to said elementary information units to which they are assigned.

11. A method according to claim 5, comprising storing said elementary information units identifiers in a database.

12. A method according to claim 11, further comprising using said elementary information units identifiers stored in said database for identifying at least one further, unidentified, information object.

13. A method according to claim 11, further comprising using said elementary information units identifiers stored in said database for comparing information objects.

14. A method according to claim 5, comprising storing only some of said elementary information units identifiers in a database.

15. A method according to claim 14, wherein said storing of only some of said elementary information units identifiers in a database is to achieve at least one of the following:
   reduce storage cost;
   increase efficiency of assigning of said elementary information units identifiers to said elementary information units by only performing said assignment for elementary information units identifiers that are stored in said database; and increase the efficiency of searching for said elementary information units identifiers in said database.

16. A method according to claim 14, wherein said storage of only some of said elementary information units identifiers in a database is done in a manner that ensures that any area of a given size in said information object contains a predetermined minimum number of said stored elementary information units.

17. A method according to claim 16, wherein said given size is dependent on properties of a respective information object.

18. A method according to claim 17, wherein said properties of said information object comprise at least one of the following:
importance; size; confidentiality level; and format.

19. A method according to claim 16, wherein said minimum number is dependent on properties of said information object.

20. A method according to claim 19, wherein said properties of said information object comprise at least one of the following:
importance; size; confidentiality level; and format.

21. A method according to claim 5, comprising applying preprocessing to said elementary information units before assigning identifiers thereto.

22. A method according to claim 21, wherein said preprocessing is done in order to enhance at least one of efficiency and robustness.

23. A method according to claim 21, wherein said preprocessing comprises at least one of canonization; removal of common words; removal of words not having a substantial effect on the meaning of a text; removal of punctuation; correction of spelling; canonization of spelling; scene detection; canonizing size; canonizing orientation; canonizing color; removing color; reducing noise; enhancing area separation; enhancing borders; enhancing lines; sharpening; blurring; removal of elementary information units substantially similar to neighboring elementary information units; canonization of grammar; and transformation to a phonetic representation.

24. A method according to claim 21, comprising carrying out said preprocessing so as to ensure that any area of a given size in said information object contains at least a predetermined number of said elementary information units having an assigned elementary information unit identifier.

25. A method according to claim 24, wherein said given size is dependent on properties of said information object.

26. A method according to claim 25, wherein said properties of said information object comprise at least one of a group comprising: importance; size; confidentiality level; and format.

27. A method according to claim 24, wherein said predetermined number is dependent on properties of said information object.

28. A method according to claim 27, wherein said properties of said information object comprise at least one of a group comprising: importance; size; confidentiality level; and format.

29. A method according to claim 5, comprising formulating respective assigned elementary information unit identifier to be resilient to small errors.

30. A method according to claim 5, wherein said assigning of elementary information unit identifier utilizes image matching.

31. A method according to claim 5, wherein said assigning of elementary information unit identifier comprises a mapping to a Euclidian space.

32. A method according to claim 31, wherein said mapping to a Euclidian space comprises approximating a pairwise difference between elementary information units.

33. A method according to claim 32, wherein said approximating is such that a difference between two elementary information units approximates said pairwise difference between said two elementary information units.

34. A method according to claim 32, wherein said approximation of said pairwise difference between elementary information units comprises an approximation of at least one of the following:
semantic difference; distance measured by image matching; phonetic difference; and spelling difference.

35. A method according to claim 5, wherein said assigning of said elementary information unit identifier is carried out a plurality of times, each time utilizing a different method for assigning of an elementary information unit identifier.

36. A method according to claim 35, wherein said assigning of elementary information unit identifier several times comprises storing of elementary information unit identifier assigned utilizing different methods are stored separately.

37. A method according to claim 35, wherein said assigning of said elementary information unit identifier several times comprises storing of elementary information unit identifier assigned utilizing different methods can be distinguished according to said method utilized to assign them.

38. A method according to claim 35, wherein said different methods are selected such as to optimize between at least any two of the following:
storage space; search speed; capability to detect transformation; capability to detect a specific transformation; resilience to transformation; resolution of identification from among similar information objects; resolution of identification of boundaries within compound information objects; resilience to a specific transformation; and resilience to transformation.

39. A method according to claim 35, wherein said assigning utilizing different methods comprises utilizing said different methods sequentially until a predetermined stop condition is reached.

40. A method according to claim 5, wherein said assigning of a respective elementary information unit identifier comprises utilizing a method having at least one of the following characteristics:
order sensitive to data in the elementary information unit; order insensitive in the elementary information unit; utilizing changing definitions of the elementary information unit such that said assigning of said elementary information unit identifier is carried out a plurality of times using a plurality of definitions; utilizing an exchangeable method of preprocessing, such that said assigning of said elementary information unit identifier is carried out several times; being omission resilient; being insertion resilient; being replacement resilient; being dictionary based; being distribution based; being locality based; being histogram based; and being n-gram based.

41. A method according to claim 5, wherein said information object comprises spreadsheet data, and wherein said assigning of said elementary information unit identifier assigned to said information object comprises utilizing a method comprising at least one of the following characteristics:
invariance to linear transformation; invariance to reordering; invariance to permutation; resilience to linear transformation; resilience to reordering; resilience to permutation; resilience to minor changes; resilience to cuts;

utilizing of statistic moment; utilizing of statistic moment for a table; utilizing statistic moment for a row; utilizing statistic moment for a column; and utilizing a mathematical descriptor of the information object data.

42. A method according to claim 5, comprising utilizing said elementary information unit identifiers for said information object identification using a technique having at least one of the following characteristics: omission resilience; insertion resilience; replacement resilience; being dictionary based; being distribution based; being locality based; being based on the size of elementary information units; being based on the size of information objects; resilience to linear transformation; resilience to reordering; resilience to permutation; resilience to minor changes; resilience to cuts; being histogram based; and being n-gram based.

43. A method according to claim 5, comprising using said determining to locate at least one information object with similar content to a given information object.

44. A method according to claim 43, wherein said locating is done in an information storage medium.

45. A method according to claim 44, further comprising utilizing a crawler for automatic location of information objects within said information storage medium.

46. A method according to claim 44, wherein said information storage medium comprises at least one file system.

47. A method according to claim 1, wherein said information object identification is carried out on an instance of said information object, said information object instance being said information object in a specific format.

48. A method according to claim 47, wherein said format comprise at least one of the following:
jpeg image; gif image; Word document format; Lotus notes format; mpeg format; text format; rich text format; Unicode text format; multi byte text encoding format; formatted text format; ASCII text format; HTML; XML; PDF; postscript; MS-Excel spreadsheet; MS-Excel drawing; MS-Visio drawing; Photoshop drawing; AutoCAD drawing format; and CAD drawing format.

49. A method according to claim 1, wherein said information comprises at least one of the following:
numeric data; spreadsheet data; numeric spreadsheet data; textual spreadsheet data; word processor data; textual data; hyper text data; audio data; visual data; multimedia data; binary data; raw data; database data; video data; drawing data; chart data; picture data; and image data.

50. A method according to claim 1, comprising using said a determined quantity to attach to said information object an information object policy, said policy comprising at least one of the following:
an allowed distribution of said information object;
a restriction on distribution of said information object;
an allowed storage of said information object;
a restriction on storage of said information object;
an action to be taken as a reaction to an event;
an allowed usage of said information object; and
a restriction on usage of said information object.

51. A method according to claim 50, wherein said information object policy comprises at least one action to be taken as a reaction to an event, and wherein said action comprises at least one of the following:
preventing distribution of said information object; preventing storage of said information object; preventing usage of said information object; reporting distribution of said information object; reporting storage of said information object; reporting usage of said information object; reporting; alerting about distribution of said information object; alerting storage of said information object; alerting usage of said information object; alerting; logging distribution of said information object; logging storage of said information object; logging usage of said information object; logging; notifying about distribution of said information object; notifying about storage of said information object; notifying about usage of said information object; notifying; notifying to an administrator; notifying to a manager; notifying to a recipient; notifying to a sender; notifying to an owner of said information object; quarantine; alerting an administrator; alerting a manager; alerting a recipient; alerting a sender; alerting an owner of said information object; reporting to an administrator; reporting to a manager; reporting to a recipient; reporting to a sender; reporting to an owner of said information object; encrypting said information object; changing said information object; replacing said information object; and utilizing digital rights management technology on said information object.

52. A method according to claim 50, wherein said information object policy comprises at least one action to be taken as a reaction to an event, and wherein said event comprises at least one of the following:
attempted distribution of said information object; attempted storage of said information object;
attempted usage of said information object; distribution of said information object; storage of said information object; and usage of said information object.

53. A method according to claim 52, wherein said policy comprises at least one mandatory lifecycle.

54. A method according to claim 53, wherein said action is dependent on the matching of said mandatory lifecycle with a lifecycle of a respective event.

55. A method according to claim 53, wherein said mandatory lifecycle comprises at least one mandatory recipient of said information object; and an order of events concerning said information object.

56. A method according to claim 50, wherein said information object usage comprises at least one of the following:
copying an excerpt; editing; copying to clipboard; copying an excerpt to clipboard; changing format; changing encoding; encryption; decryption; changing digital management; opening by an application; and printing.

57. A method according to claim 50, wherein said information object policy comprises placing a substantially imperceptible marking in said information object, said marking comprising information content, and said method comprising placing said marking, when indicated by said policy, before allowing at least one of the following:
storage of said information object; usage of said information object; and distribution of said information object.

58. A method according to claim 57, wherein said information content for storage in said marking comprises at least one of the following:
the identity of said information object;
the identity of a user performing the action in respect to said information object;
the identity of a user authorizing the action in respect to said information object;
the identity of a user overriding policy and approving the action in respect to said information object; and
the identity of a user requesting the action in respect to said information object.

59. A method according to claim 50, wherein said information object policy further comprises changing said information object by at least one of the following:

deleting part of said information object; replacing part of said information object; and inserting an additional part to said information object before allowing at least one of the following actions:
storage of said information object; usage of said information object; and distribution of said information object.

60. A method according to claim 59, wherein said changing of said information object is done in order to eliminate parts having policies that do not allow for said action to be executed while they are in the document.

61. A method according to claim 59, wherein said changing of said information object is carried out in order to personalize said information object.

62. A method according to claim 59, wherein said changing of said information object is carried out in order to customize said information object for a specific use.

63. A method according to claim 59, wherein said changing of said information object is done in a manner selected to achieve at least one of the following:
preserving the coherency of said information object; seamlessness; preserve the structure of said information object; preserving the linguistic coherency of said information object; preserving the formatting style of said information object; and preserve the pagination style of said information object.

64. A method according to claim 59, wherein said information objects comprise compound information objects and wherein said changing of said information object is made to constituent parts of a compound information object.

65. A method according to claim 59, wherein said inserting an additional part to said information object comprises inserting at least one of the following: a header; a footer; and a disclaimer.

66. A method according to claim 50, wherein said storing comprises storage in at least one of the following:
a portable media device; a floppy disk; a hard drive; a portable hard drive; a flash card; a flash device; disk on key; magnetic tape; magnetic media; optic media; punched cards; a machine readable media; a CD; a DVD; a firewire device; a USB device; and a hand held computer.

67. A method according to claim 50, wherein said policy comprises distribution regulation, said distribution regulation being for regulating at least one of the following:
sending said information object via mail;
sending said information object via web mail;
uploading said information object to a web server;
uploading said information object to a FTP server;
sending said information object via a file transfer application;
sending said information object via an instant messaging application;
sending said information object via a file transfer protocol; and
sending said information object via an instant messaging protocol.

68. A method according to claim 50, wherein said policy is dependent on at least one of the following:
the domain of a respective information object; the identity of a system; the identity of a user; the identity level of a user authorizing an action; the identity of a user requesting an action; the identity of a user involved in an action; the identity of a user receiving an information object; the authentication level of a system; the authentication level of a user; the authentication level of a user requesting an action; the authentication level of a user authorizing an action; the authentication level of a user involved in an action; the authentication level of a user receiving said information object; the authentication level of a user sending said information object; the format of an information object instance; an interface being used; an application being used; encryption being used; digital rights management technology being used; detection of transformation, wherein said transformation is operable to reduce the ability to identify said transformed information object; information object integrity; regular usage pattern; regular distribution pattern; regular storage pattern; information path; consistency of an action with usage pattern; the identity of a user overriding policy and authorizing the action in respect to said information object; the authentication level of a user overriding policy and authorizing the action in respect to said information object; the identity of a user sending information object; information property of said information object; language of said information object; representation of said information object; operations done on of said information object; identity of users involved along the life cycle of said information object; application used on of said information object; transition channel of said information object; participant agents; virtual location of a computer; logical location of a computer; physical location of a computer; type of a computer; type of a laptop computer; type of a desktop computer; type of a server computer; and owner identity.

69. A method according to claim 50 or claim 68, further comprising defining areas and wherein said policy is dependent on whether an action is taken inside a given defined area.

70. A method according to claim 50 or claim 68, further comprising defining areas and wherein said policy is dependent on whether an event occurs inside a given defined area.

71. A method according to claim 50, further comprising enabling at least one user to override at least one of decisions contained within said policy.

72. A method according to claim 50, wherein at least part of said policy is stored in a database.

73. A method according to claim 50, wherein at least part of said policy is defined in terms of a logic expression.

74. A method according to claim 73, wherein said expression is evaluated by lazy evaluation.

75. A method according to claim 73, wherein at least some of the variables in said logic expression comprise of at least on of the following:
an external function; an external function based on group membership; and an external variable.

76. A method according to claim 50, comprising defining an information class as a group consisting of at least two information objects, said defining further comprising associating with said information class a corresponding class policy being a policy shared by said information objects.

77. A method according to claim 76, wherein said information class policy comprises at least a part of respective policies of said information objects within said class.

78. A method according to claim 76, wherein said information class is a knowledge class.

79. A method according to claim 50, wherein at least part of said policy is defined in terms of any one of a group comprising rules, imposed restrictions, granted privileges, reaction to one or more given events, group operations, a property of said information object, a property of a user, a property of a computer, a property of an entity, and a hierarchy of calculations.

80. A method according to claim 50, wherein at least part of said policy is defined in terms of a role, wherein said role consists of a property of at least one of a user and a system and wherein said role further comprises at least one authorization.

81. A method according to claim 50, wherein at least part of said policy is defined in terms of at least one of the following languages:
a scripting language; an ordered calculation language; a programming language; an interpreted language; and a functional language.

82. A method according to claim 81, wherein said at least one of said following languages comprises instructions for the operation of an ordered calculation resulting in at least one of the following:
policy; instruction to perform an action; restriction; and allowance.

83. A method according to claim 50, wherein said information object is a compound information object comprising constituent simple information objects, and a respective policy assigned to said information object comprises different policies for at least some of said constituent information objects.

84. A method according to claim 50, comprising using organizational structure information in order to assign a respective policy object.

85. A method according to claim 50, wherein at least a part of an information object policy of a respective information object is derived from a default information object policy when said part of said information object policy of said information object is not explicitly defined.

86. A method according to claim 50, wherein an information object policy comprises at least some information about one or more methods utilized for assigning of an elementary information unit identifier to a respective information object.

87. A method according to claim 50, further comprising changing access control information in accordance with said policy.

88. A method according to claim 50, comprising attaching a respective policy to information objects according to their logical location within an information storage medium.

89. A method according to claim 88, further comprising utilizing a crawler for automatic location of information objects within said information storage medium.

90. A method according to claim 89, wherein said information storage medium
is a file system.

91. A method according to claim 1, wherein said determining said determined quantity comprises utilizing conditional probabilities for at least one of the following:
identification of information objects;
classification of information objects; and
identification of a knowledge domain of information objects.

92. A method according to claim 1, wherein said determining said determined quantity further comprises utilizing keywords for at least one of the following:
identification of information objects; identification of elementary information units; classification of information objects; and identification of the domain of information objects.

93. A method according to claim 92, wherein said keywords are stored in a database.

94. A method according to claim 92, wherein said keywords are stored in at least one of the following forms:
hash value; raw string; and numeric representation.

95. A method according to claim 1, wherein at least one user is defined in an owner definition as an owner of said information object.

96. A method according to claim 95, wherein said owner definition is stored in a database.

97. A method according to claim 1, wherein said determining said quantity further comprises utilizing organizational structure information.

98. A method according to claim 97, wherein said organizational structure information comprise at least one of the following:
user superiority; working groups; organizational hierarchy; departmental separation; and membership in working groups.

99. A method according to claim 97, wherein at least part of said organizational structure information is stored in a database.

100. A method according to claim 97, wherein at least part of said organizational structure information is used for information object classification.

101. A method according to claim 97, wherein at least part of said organizational structure information is imported from at least one of the following:
organizational data system; data management system; organizational data management system;
knowledge management system; user directory; LDAP server; document; and an organizational chart.

102. A method according to claim 1, further comprising making use of at least one user interface operable to assist in at least one of the following:
classification; policy definition; template definition; approving and revising automatic template definition; importing organizational structure information; revising organizational structure information; produce reports; overriding policy decisions; and providing authorizations.

103. A method according to claim 1, further comprising using template information objects to represent commonly repeated information, such that a template information object together with a difference information object representing instance specific information are together formable to produce a compound information object in which common and specific information are respectively identifiable.

104. A method according to claim 103, comprising using said template information object in identifying any of unknown information object comprising information corresponding to said template information object.

105. A method according to claim 103, wherein said template information object is a compound information object, wherein said template information object comprises at least one placeholder, and wherein said method comprises replacing said placeholder by at least part of said difference information object when said difference information object and a respective template information object are combined.

106. A method according to claim 105, wherein at least one of said placeholders is a specialized placeholder, said specialized placeholder comprising specialization information to identify a respective specialization of said specialized placeholder.

107. A method according to claim 106, wherein said specialized placeholder comprises a restriction about information objects permitted for replacing said specialized placeholder, and wherein said restriction comprises a rule for excluding at least one of the following:
an object comprising numeric information;
an object comprising a word;
an object comprising a character;
an object comprising a digit;
an object comprising a sentence; and
an object comprising a simple information object.

108. A method according to claim 105, wherein at least one of said placeholders is a specialized placeholder, said specialized placeholder comprising a restriction about information objects permitted for replacing said specialized placeholder.

109. A method according to claim 103, wherein said template information object comprises at least one of a group comprising: a disclaimer; a form; a header; a footer; a contract; and an invoice.

110. A method according to claim 103, comprising defining a template information object and wherein said defining comprises automatically identifying a template information object candidate.

111. A method according to claim 110, wherein said automatically identifying a template information object candidate comprises identification of shared elementary information units of at least two information objects.

112. A method according to claim 110, wherein said step of automatically identifying a template information object candidate comprises identification of substantially similar information objects.

113. A method according to claim 110, wherein said step of automatically identifying a template information object candidate comprises the use of at least one of text parsing; and text matching.

114. A method according to claim 103, comprising deriving at least a part of a respective information object policy associated with a template instance information object from an information object policy of a respective originating template information object.

115. A method according to claim 1, further comprising a stage of detection of information objects having undergone transformations.

116. A method according to claim 115, wherein said stage of detection is aimed for detection of transformations intended to reduce the ability to identify said information object.

117. A method according to claim 115, wherein said detection of information objects that have undergone transformation comprises detection of at least one of a group comprising: transformation artifacts; spelling mistakes; wrong grammar; wrong punctuation; wrong capitalization; missing punctuation; missing capitalization; irregular word distribution; lack of common words; predominance of unknown words; inconsistent headers; headers inconsistent with file type; headers inconsistent with file content; file type inconsistent with file content; irregular distribution of characters; irregular distribution of words; irregular distribution of character sequences; irregular distribution of word sequences; irregular length of words; irregular length of sentences; irregular distribution of length of words; irregular distribution of length of sentences; irregular file format; irregular file encoding; unknown file format; unknown file encoding; mix of non-alphabetic characters; unopenable file; action time; information object creation time; information object update time; encryption; and an unexpectedly high level of entropy.

118. A method according to claim 1, wherein said information object is a knowledge object.

119. A method according to claim 2, wherein said elementary information unit is an elementary fact.

120. A method according to claim 119, wherein said elementary fact comprises at least one of the following: sentence; database entry; representation independent description of knowledge; modular description of knowledge; and abstract description of knowledge.

121. A method according to claim 1, further comprising a stage of discerning lifecycle information about a respective information object.

122. A method according to claim 121, wherein said discerning of information about the lifecycle of said information object comprises utilizing information about sharing of at least one elementary information unit in said information object, wherein said elementary information unit is shared with at least one additional information object.

123. A method according to claim 121, wherein said discerning of information about the lifecycle of said information object is based on at least one of a group comprising: file system date information; information about editing of said information object; and information about registration of said information object.

124. A method according to claim 121, comprising utilizing said information about the lifecycle of said information object for the creation of a lifecycle graph.

125. A method according to claim 121, comprising utilizing said information about the lifecycle of said information object to define at least part of the policy of said information object said utilizing comprising identifying at least one other information object along said information object's lifecycle and examining a policy associated therewith.

126. A method according to claim 1, further comprising utilizing a client.

127. A method according to claim 126, wherein said client comprises at least one of the following:
end point software; end point hardware; tamper resistant software; tamper resistant hardware;
client side software; and client side hardware.

128. A method according to claim 126, comprising utilizing said client for at least one of the following:
monitoring of client side storage; monitoring of client side access; monitoring of client side usage;
monitoring of client side distribution;
monitoring of copying of information object excerpts;
monitoring of clipboard;
monitoring of at least one application;
monitoring of at least one interface;
control of at least one application;
control of at least one interface;
control of clipboard;
control of copying of information object excerpts;
control of client side storage;
control of client side access;
control of client side usage; and
control of client side distribution.

129. A method according to claim 1, comprising utilizing comparing of at least two information objects to calculate pairwise similarity between objects.

130. A method according to claim 129, comprising utilizing said pairwise similarity to map said information objects to a space.

131. A method according to claim 130, wherein said space is an Euclidian space, and wherein the closeness between any two objects within said Euclidian space is approximately proportional to said pairwise similarity between said information objects.

132. A method according to claim 130, wherein said space is a weighted graph, and wherein the weight of an edge between any two objects within said graph space is approximately proportional to said pairwise similarity between said information objects.

133. A method according to claim 130, wherein said space is a graph, and wherein the existence of an edge between any two objects within said graph space is dependent on said pairwise similarity between said information objects.

134. A method according to claim 130, wherein said space is utilized to identify at least one similarity information class, wherein said information class consists of at least two information objects, wherein there is provided an information class policy comprising a policy shared by the information class, and wherein said similarity information class is bounded within said space.

135. A method according to claim 130, comprising utilizing said space to identify at last one information object substantially similar to an unidentified information object.

136. A method according to claim 130, comprising using said space to identify at least one other information object substantially similar to an information object for which policy is not known, thereby to obtain a policy associated with said other information object to use as basis for a policy for said information object.

137. A method according to claim 1, comprising storing information about said information object in a database.

138. A method according to claim 1, further comprising extracting a descriptor of said information object, based on statistical analysis of said information object.

139. A method according to claim 2, comprising storing the order of said elementary information units within said information object in a database.

140. A method according to claim 139, comprising using said order for identification of said information object.

141. A method according to claim 1, further comprising interfacing at least one of an information management system; and a document management system.

142. A method according to claim 1, further comprising tracking at least one of the following:
usage patterns; storage patterns; and distribution patterns.

143. A method according to claim 142, wherein said tracking is carried out to infer information about at least one of the following:
normal usage patterns; normal storage patterns; normal distribution patterns; irregular usage patterns; irregular storage patterns; and irregular distribution patterns.

144. A method according to claim 143, wherein said inferred information is used to define at least part of a policy.

145. A method according to claim 143, comprising using said inferred information for information object classification.

146. A method according to claim 1, further comprising logging.

147. A method according to claim 146, wherein said logging comprising logging of at least one of the following:
actions; events; and information objects identification.

148. A method according to claim 146, wherein at least part of said logging is controlled by a policy.

149. A method according to claim 146, wherein at least part of said logging is stored in a database.

150. A method according to claim 146, comprising utilizing said logging to augment lifecycle information for said information object.

151. A method according to claim 1, further comprising assessing the integrity of at least one information object, wherein said integrity assessment consists of comparing said information object with a version of said information object for which integrity is assured.

152. A method according to claim 151, further comprising issuing a certificate of said integrity for at least one information object.

153. A method according to claim 152, wherein said certificate is a cryptographic certificate.

154. A method according to claim 151, further comprising replacing said information object with said version of said information object for which said integrity is assured.

155. A method according to claim 151, comprising identifying when said integrity of said information object is not satisfactory, and in such a case not allowing distribution of said information object.

156. A method according to claim 151, comprising identifying when said integrity of said information object is not satisfactory, and in such a case not allowing storage of said information object.

157. A method according to claim 151, comprising identifying when said integrity of said information object is not satisfactory, and in such a case not allowing usage of said information object.

158. A method according to claim 1, further comprising defining at least one constituent information object to be an ignored information object, and wherein, whenever said to be ignored information object is an element of a compound information, ignoring said object in identification of said compound information object.

159. A method according to claim 1, further comprising not allowing usage of respective ones of said information objects outside an organization.

160. A method according to claim 1, further comprising not allowing storage of respective ones of said information object outside an organization.

161. A method according to claim 1, further comprising not allowing distribution of respective ones of said information object outside an organization.

162. Apparatus for automatic information identification to enforce an information management policy over a period of time on information objects that are subject to evolution of content contained therein over said period of time, said information objects containing elementary information units, the apparatus being a computerized apparatus comprising:
a scanning module for identifying an information object in use subsequent to at least some of said evolution, finding respective elementary information units within said information object, some of said elementary information units not being subject to said evolution, and comparing said found elementary information units with elementary information units of a pre-evolution information object to which an instance of said information management policy was applied, said comparison finding a quantity of elementary information units that match; and
a deduction module for deducing information about the identity of said information object in use by comparing said quantity to a predetermined threshold, and when said threshold is exceeded, applying said policy instance to said information object in use, said managing thereby being applied to said information object in use despite evolution of said content contained in said information object over said time period.

163. Apparatus according to claim 162, wherein said information objects comprise at least one simple information object, said simple information object comprising one of the following:
an elementary information unit;
a set of elementary information units; and
an ordered set of elementary information units.

164. Apparatus according to claim 162, wherein said elementary information units comprise at least one of the following:
a sentence; a sequences of words; a word; a sequence of characters; a character; a sequence of numbers; a number; a sequence of digits; a digit; a vector; a curve; a pixel; a block of pixels; an audio frame; a musical note; a musical bar; a visual object; a sequence of video frames; a sequence of musical notes; a sequence of musical bars; and a video frame.

165. Apparatus according to claim 162, wherein said deduction module is further configured to assign elementary information unit identifiers to elementary information units after identification.

166. Apparatus according to claim 162, wherein said deduction module is further configured to utilize said elementary information unit identifiers in said deducing.

167. Apparatus according to claim 165, wherein said deduction module is configured to provide said elementary information unit identifiers in a manner determined at least partly by the content of said elementary information units which they are assigned to.

168. Apparatus according to claim 167, wherein said elementary information unit identifiers are solely determined by said content.

169. Apparatus according to claim 165, wherein said deduction module is configured to provide said elementary information units identifiers in a manner at least partly determined by locations within an information object of respective elementary information units to which they are assigned.

170. Apparatus according to claim 162, wherein said information object identification is carried out on an instance of said information object, said information object instance being said information object in a specific format.

171. Apparatus according to claim 162 further comprising a policy attachment unit associated with said deduction module, said policy attachment unit being configured to use said deducing to attach to said information object an information object policy, said policy comprising at least one of the following:
  an allowed distribution of said information object;
  a restriction on distribution of said information object;
  an allowed storage of said information object;
  a restriction on storage of said information object;
  an action to be taken as a reaction to an event;
  an allowed usage of said information object; and
  a restriction on usage of said information object.

172. Apparatus according to claim 162, wherein said deducing comprises utilizing conditional probabilities for at least one of the following:
  identification of information objects;
  classification of information objects; and
  identification of a knowledge domain of information objects.

* * * * *